US012684615B2

(12) United States Patent
Salem et al.

(10) Patent No.: US 12,684,615 B2
(45) Date of Patent: Jul. 14, 2026

(54) SELECTED BEAM AND TRANSMISSION BEAM SPATIAL RELATIONSHIP

(71) Applicant: HUAWEI TECHNOLOGIES CO., LTD., Shenzhen (CN)

(72) Inventors: Mohamed Adel Salem, Kanata (CA); Keyvan Zarifi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 18/497,991

(22) Filed: Oct. 30, 2023

(65) Prior Publication Data

US 2024/0063881 A1      Feb. 22, 2024

Related U.S. Application Data

(63) Continuation of application No. PCT/CN2022/091831, filed on May 10, 2022.

(60) Provisional application No. 63/187,098, filed on May 11, 2021.

(51) Int. Cl.
H04W 74/0808          (2024.01)

(52) U.S. Cl.
CPC ............................... H04W 74/0808 (2013.01)

(58) Field of Classification Search
CPC ............. H04W 74/0808; H04B 7/0617; H04B 7/06966; H04B 7/088
See application file for complete search history.

(56) References Cited

U.S. PATENT DOCUMENTS

| 2016/0037560 A1* | 2/2016 | Liu ................... H04W 74/0808 |
| | | 370/329 |
| 2019/0097874 A1 | 3/2019 | Zhou et al. |
| 2019/0141744 A1* | 5/2019 | Naghshvar ........... H04B 7/0695 |
| 2019/0215140 A1* | 7/2019 | Hafeez ................ H04W 72/541 |
| 2020/0084804 A1* | 3/2020 | Zhang ............... H04W 72/0446 |

(Continued)

FOREIGN PATENT DOCUMENTS

| CN | 109150445 B | 8/2021 |
| CN | 112217541 B | 12/2021 |

(Continued)

OTHER PUBLICATIONS

Huawei et al., "Channel access mechanism for 60 GHz unlicensed operation", 3GPP TSG RAN WG1 Meeting #104bis-e, R1-2102332, Apr. 20, 2021.

(Continued)

*Primary Examiner* — Faruk Hamza
(74) *Attorney, Agent, or Firm* — Slater Matsil, LLP

(57)          ABSTRACT

Some embodiments of the present disclosure enable a device to select a spatial domain filter such that a resultant listen-before-talk (LBT) sensing beam, or a subsequent transmit/receive beam, has a specific spatial relationship with a plurality of transmission beams for transmissions that are multiplexed in a space division multiplexed (SDM) manner, multiplexed in a time division multiplexed (TDM) manner or a multiplexed in a combination of both an SDM manner and a TDM manner. The selection of the spatial sensing filter for the LBT sensing beam may be based on the spatial (Continued)

attributes of the transmission beams, including at least one of beamwidth, beam peak direction and beam center direction.

20 Claims, 12 Drawing Sheets

(56)                   References Cited

U.S. PATENT DOCUMENTS

| 2020/0252923 | A1* | 8/2020 | Yerramalli | H04B 7/088 |
|---|---|---|---|---|
| 2020/0336921 | A1* | 10/2020 | Yerramalli | H04W 74/0808 |
| 2021/0135714 | A1 | 5/2021 | Pezeshki et al. | |
| 2021/0204276 | A1* | 7/2021 | Ge | H04L 1/0026 |
| 2022/0295556 | A1* | 9/2022 | Lo | H04W 74/0808 |
| 2022/0353892 | A1* | 11/2022 | Cirik | H04L 5/0096 |
| 2023/0091023 | A1* | 3/2023 | Myung | H04W 74/0816 370/329 |
| 2023/0188196 | A1* | 6/2023 | Zander | H04B 7/0695 370/252 |
| 2023/0262764 | A1* | 8/2023 | Myung | H04W 74/0866 370/329 |
| 2024/0015764 | A1* | 1/2024 | Cirik | H04W 72/1273 |
| 2024/0032106 | A1* | 1/2024 | Chen | H04W 74/0833 |
| 2024/0064772 | A1* | 2/2024 | MolavianJazi | H04L 5/0092 |
| 2024/0223316 | A1* | 7/2024 | Guan | H04L 1/189 |
| 2024/0235794 | A1* | 7/2024 | Zhu | H04L 5/0091 |
| 2024/0314767 | A1* | 9/2024 | Zhang | H04B 7/088 |
| 2024/0407000 | A1* | 12/2024 | Fu | H04B 7/06968 |
| 2025/0331005 | A1* | 10/2025 | Ghanbarinejad | H04W 72/044 |
| 2026/0051947 | A1* | 2/2026 | Azzoug | H04B 7/18513 |
| 2026/0052541 | A1* | 2/2026 | Huang | H04W 72/232 |

FOREIGN PATENT DOCUMENTS

| WO | WO-2021108817 | A2 * | 6/2021 | H04B 7/06952 |
|---|---|---|---|---|
| WO | WO-2022214501 | A1 * | 10/2022 | H04W 74/0808 |
| WO | WO-2025072907 | A1 * | 4/2025 | H04L 5/0023 |
| WO | WO-2025198939 | A1 * | 9/2025 | H04L 27/26025 |

OTHER PUBLICATIONS

3GPP TS 38.104 V17.0.0, "Base Station (BS) radio transmission and reception", Release 17, Dec. 2020.

3GPP TR 38.807 V16.1.0, "Study on requirements for NR beyond 52.6 GHz", Release 16, Mar. 2021.

3GPP TSG RAN WG1 Meeting #104-e, RAN1 Chairman s Notes, e-Meeting, Jan. 25-Feb. 5, 2021.

3GPP TSG RAN meeting #88e, RP-200901, "Revised SID: Study on supporting NR from 52.6GHz to 71 GHz", e-Meeting, Jun. 29-Jul. 3, 2020.

3GPP TSG RAN Meeting #90-e, RP-202925, "Revised WID: on Extending current NR operation to 71 GHz", e-Meeting, Dec. 7-11, 2020.

ETSI BRAN EN 302 567 V2.1.2, "Multiple-Gigabits radio equipment operating in the 60 GHz band;Harmonised Standard for access to radio spectrum", May 2021, 42 pages.

3GPP TSG RAN WG1 Meeting #104bis-e, R1-2102322 "Initial evaluation results for XR and Cloud Gaming" Apr. 12-Apr. 20, 2021, total 10 pages.

* cited by examiner 110, 170 or 172

OPERATING SYSTEM MODULE

TRANSMITTING MODULE

RECEIVING MODULE

PROCESSING MODULE

MACHINE LEARNING MODULE

SELECTED BEAM AND TRANSMISSION BEAM SPATIAL RELATIONSHIP

CROSS-REFERENCE TO RELATED APPLICATIONS

This application is a continuation of PCT application No. PCT/CN2022/091831 filed on May 10, 2022, which claims the benefit of priority to U.S. provisional Patent Application No. 63/187,098 filed on May 11, 2021, entitled "LISTEN BEFORE TALK BEAM AND TRANSMISSION BEAM SPATIAL RELATIONSHIP" the contents of which are incorporated herein by reference in their entirety.

TECHNICAL FIELD

The present disclosure relates, generally, to channel access mechanisms and spatial (domain) transmission and/or reception and, in particular embodiments, to channel access mechanisms and spatial domain transmission/reception in mmWave unlicensed bands. Even more particularly, present disclosure relates to selecting a spatial filter resulting in a beam, for example, a listen before talk (LBT) beam or a transmit/receive beam, on the basis of a spatial relationship between the LBT beam and a transmission beam or a spatial relationship between the wide transmit/receive beam. Here, the transmit/receive beam can be either a transmit beam or a receiver beam, which optionally may be made wide.

BACKGROUND

The 3rd Generation Partnership Project (3GPP) has extensively studied operation of fifth generation (5G) mobile networks. 5G New Radio (NR) is a radio access technology (RAT) developed by the 3GPP for 5G mobile networks. Notably, frequency bands for 5G NR are considered to be classified into two different frequency ranges. The first frequency range is referenced as Frequency Range 1 (FR1). FR1 is defined to include frequency bands under 6 GHz. FR1 covers some frequency bands traditionally used by previous standards. FR1 also covers potential new spectrum offerings from 410 MHz to 7125 MHz. The second frequency range is referenced as Frequency Range 2 (FR2). FR2 is defined to include frequency bands from 24.25 GHz to 52.6 GHz, known as a "millimeter wave" or "mmWave" frequency range.

Recently, in a Technical Report (TR) studying operation of NR beyond 52.6 GHz, it was decided to extend FR2 operation up to 71 GHz (see 3GPP TR 38.807, "Study on requirements for NR beyond 52.6 GHz").

It is known that mmWave operation leads to increased path loss relative to lower frequencies. However, it is also known that wireless nodes can be equipped with a large number of antenna elements. Accordingly, it is expected that these wireless nodes may engage in beamforming and highly directional transmissions to combat the path loss.

The 3GPP has published a study item description (SID) that focuses on support for extending the operation of NR to the frequencies between 52.6 GHz and 71 GHz (see RP-200901 Revised SID: "Study on supporting NR from 52.6 GHz to 71 GHz," RAN #88e). The referenced SID addresses channel access mechanisms by considering three factors. A first factor is potential interference to/from other nodes while assuming beam-based operation. A second factor is compliance with regulatory requirements applicable to unlicensed spectrum, i.e., the 60 GHz shared spectrum. A third factor is coexistence with other incumbent radio access technologies (RATs) such as 802.11ad Directional Multi-Gigabit (DMG) or WiGig and/or 802.11ay Enhanced DMG (EDMG).

In addition, the 3GPP has published a work item description (WID) that focuses on supporting the extension of NR operation up to 71 GHz (see RP-193229 "New WID on Extending current NR operation to 71 GHz," RAN #86, available from www.3gpp.org). The WID considers both licensed and unlicensed operation. It is known that 5G NR-based access to unlicensed spectrum, which is often shortened to NR-U (NR-U), is a RAT that is designed to operate in the 5 and 6 GHz bands alongside Wi-Fi. The WID proposes leveraging procedures adopted for NR-U as procedures for operating in the unlicensed 60 GHz band. Some physical layer aspects and procedures were identified as objectives of the WID. In particular, for new numerology introduced, timeline-related aspects are considered. The WID considers support of up to 64 synch block SSB beams for licensed and unlicensed operation. The WID further considers channel access mechanisms, assuming beam-based operation in compliance with regulatory requirements applicable to the 60 GHz unlicensed spectrum. The WID also notes that, for operation in the proposed extended frequency band, NR/NR-U operation can be stand-alone operation or aggregated operation, via carrier aggregation (CA) or dual connectivity (DC) with an anchor carrier.

It is known that omni-directional LBT sensing may cause an over-protection problem, if used for sensing the channel before directional transmissions. Furthermore, it is known that there is complexity in configuring and employing multiple, directional LBT sensing beams for multiple intended transmission directions.

SUMMARY

According to aspects of the present application, a device may select a spatial sensing filter such that a resultant listen-before-talk (LBT) sensing beam has a specific spatial relationship with a plurality of transmission beams for transmissions that are multiplexed in a space division multiplexed (SDM) manner, multiplexed in a time division multiplexed (TDM) manner or a multiplexed in a combination of both an SDM manner and a TDM manner. The selection of the spatial sensing filter for the LBT sensing beam may be based on the spatial attributes of the transmission beams, including at least one of beamwidth, beam peak direction and beam center direction. In embodiments of the present invention, the spatial sensing filter can be also named as a spatial domain sensing filter. The spatial (domain) sensing filter is one kind of spatial (domain) filter.

Embodiments of the present invention can be used for not only a LBT sensing beam but also a (subsequent) transmit/receive beam. In one example, by selecting a spatial sensing filter such that a resultant LBT sensing beam has a specific spatial relationship with a plurality of transmission beams, the LBT sensing beam may be made wide, yet directional. The wide, yet directional, features of the LBT sensing beam allow for increased channel access probability and/or spatial reuse opportunities. Furthermore, the use of the single, directional LBT sensing beam may be shown to reduce LBT complexity and energy consumption compared to the use of multiple, directional LBT sensing beams. Similarly, in another example, by selecting a spatial filter such that a transmit/receive beam has a specific spatial relationship with a plurality of transmission beams, the transmit/receive beam, may be made wide, yet directional. The wide, yet directional, features of the transmit/receive beam allow for increased channel access probability and/or spatial reuse opportunities. Furthermore, the use of the single, directional transmit/receive beam may be shown to reduce energy consumption compared to the use of multiple, directional transmit/receive beams.

According to an aspect of the present disclosure, there is provided a method of operating a device, e.g., in a millimeter wave shared spectrum mobile communication network. The method includes selecting a spatial sensing filter resulting in a listen-before-talk (LBT) sensing beam, thereby obtaining a selected LBT sensing beam, wherein the selecting includes determining a spatial relationship between the selected LBT sensing beam and a plurality of transmission beams to be used for a corresponding plurality of subsequent transmissions, carrying out an LBT procedure using the selected spatial sensing filter and, upon determining LBT success, transmitting the plurality of subsequent transmissions. The method is particularly well suited to situations wherein at least two transmissions among the corresponding plurality of subsequent transmissions are not quasi-co-located with each other or wherein at least two transmissions among the corresponding plurality of subsequent transmissions are associated with different Transmission Configuration Indicator chains.

According to an aspect of the present disclosure, there is further provided a method of operating a device, e.g., in a millimeter wave shared spectrum mobile communication network. The method includes selecting a spatial transmit filter resulting in a transmit beam, thereby obtaining a selected transmit beam, wherein the selecting includes determining a spatial relationship between the selected transmit beam and a plurality of transmission beams to be used for a corresponding plurality of transmissions; and performing, using the selected spatial transmit filter, a transmission in the direction of the selected transmit beam. The method is particularly well suited to situations wherein at least two transmissions among the corresponding plurality of transmissions are not quasi-co-located with each other or wherein at least two transmissions among the corresponding plurality of transmissions are associated with different transmission configuration indicator (TCI) chains.

According to an aspect of the present disclosure, there is further provided a method of operating a device, e.g., in a millimeter wave shared spectrum mobile communication network. The method includes selecting a spatial receive filter resulting in a receive beam, thereby obtaining a selected receive beam, wherein the selecting includes determining a spatial relationship between the selected receive beam and a plurality of transmission beams to be used for a corresponding plurality of transmissions to a plurality of intended devices, and receiving, using the selected spatial receive filter, one or more transmissions from the plurality of intended devices in an opposite link direction. The method is particularly well suited to situations wherein at least two transmissions among the corresponding plurality of transmissions are not quasi-co-located with each other or wherein at least two transmissions among the corresponding plurality of transmissions are associated with different transmission configuration indicator (TCI) chains.

Additionally, aspects of the present application provide devices and computer storage medium storing instructions for carrying out this method, and a system thereof.

BRIEF DESCRIPTION OF THE DRAWINGS

For a more complete understanding of the present embodiments, and the advantages thereof, reference is now

Figure 1:
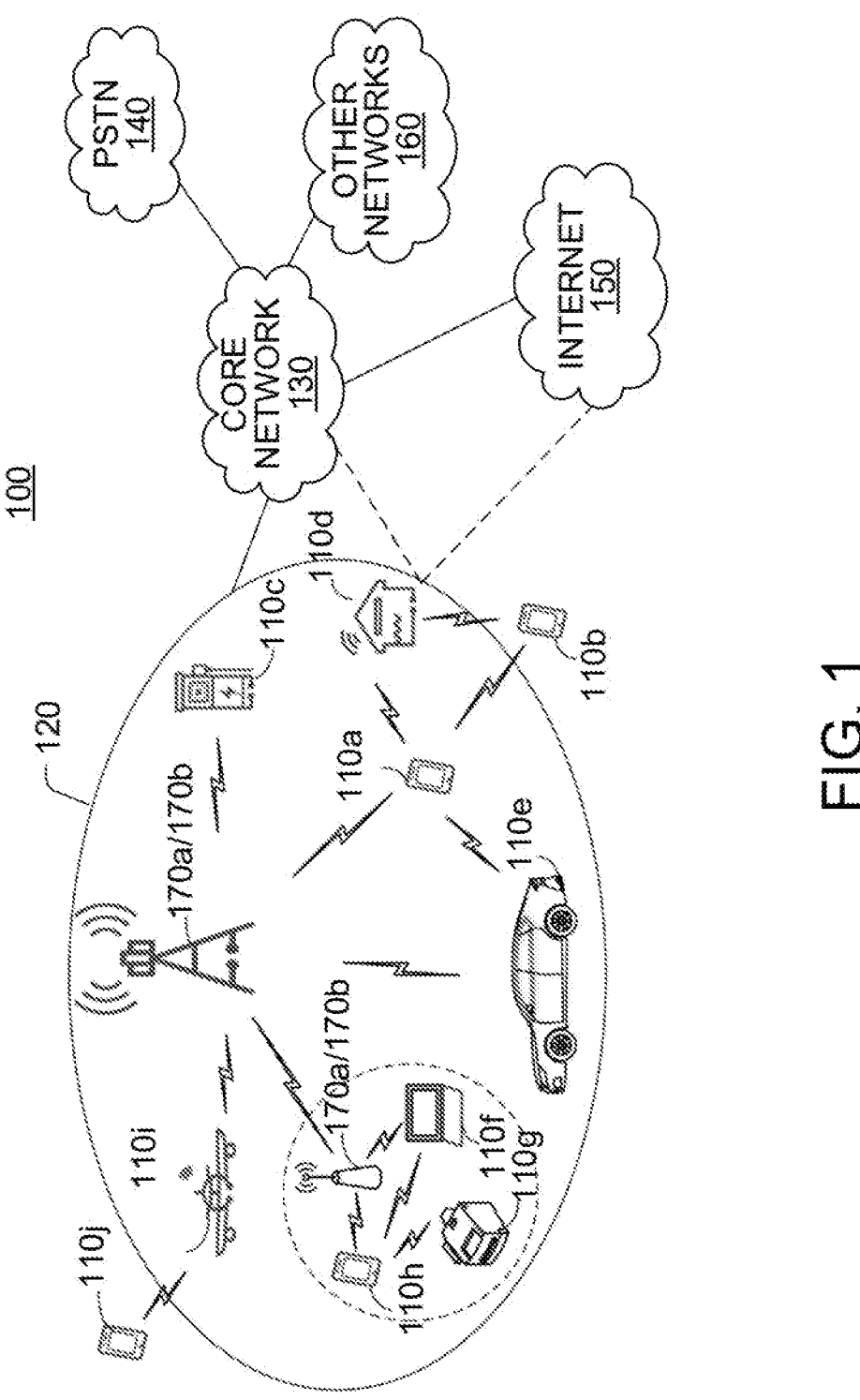
Figure 2:
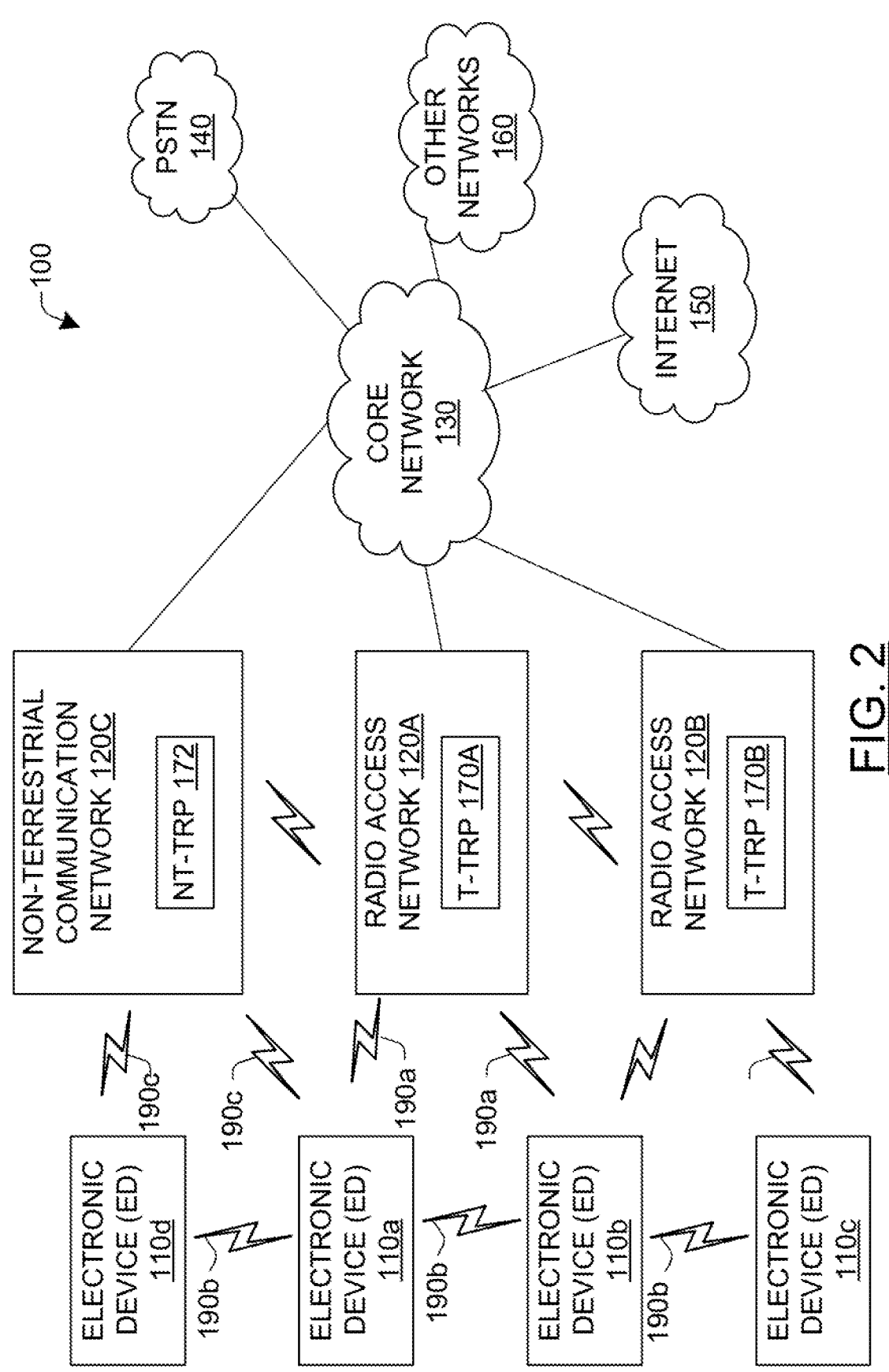
Figure 3:
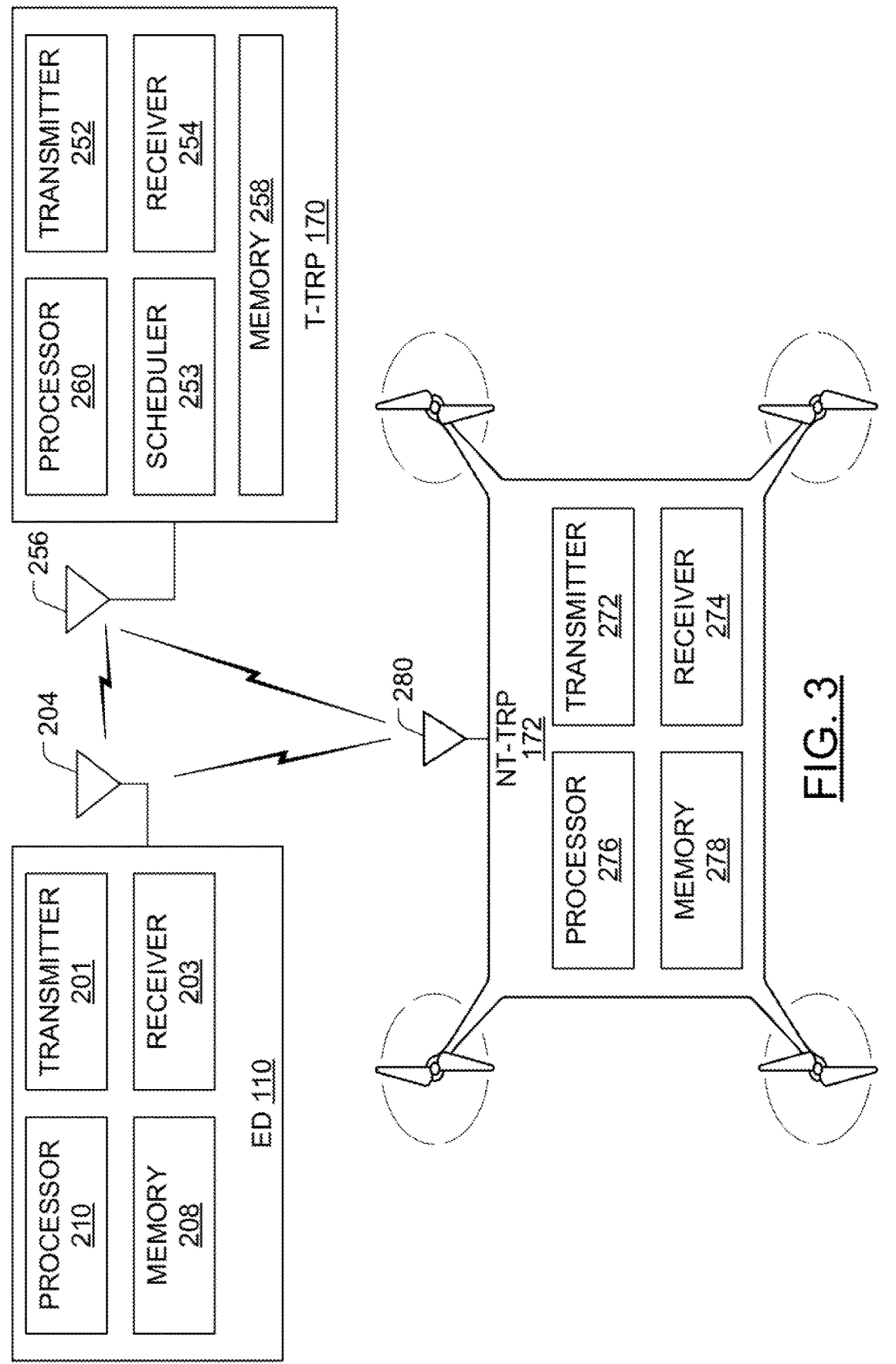
Figure 4:
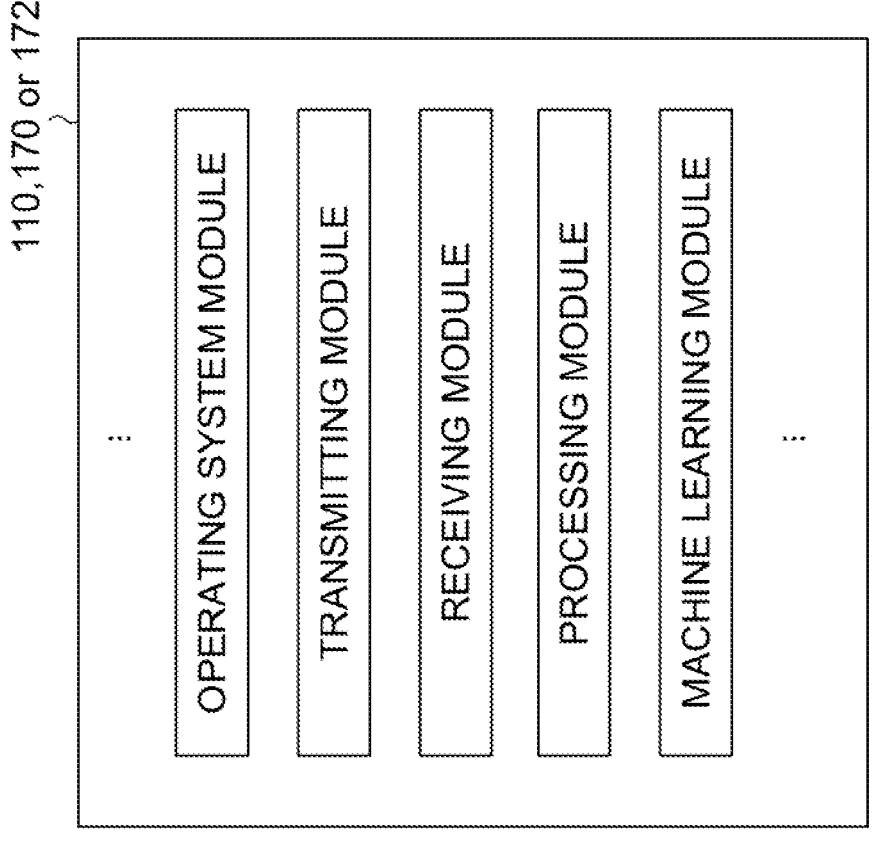
Figure 5:
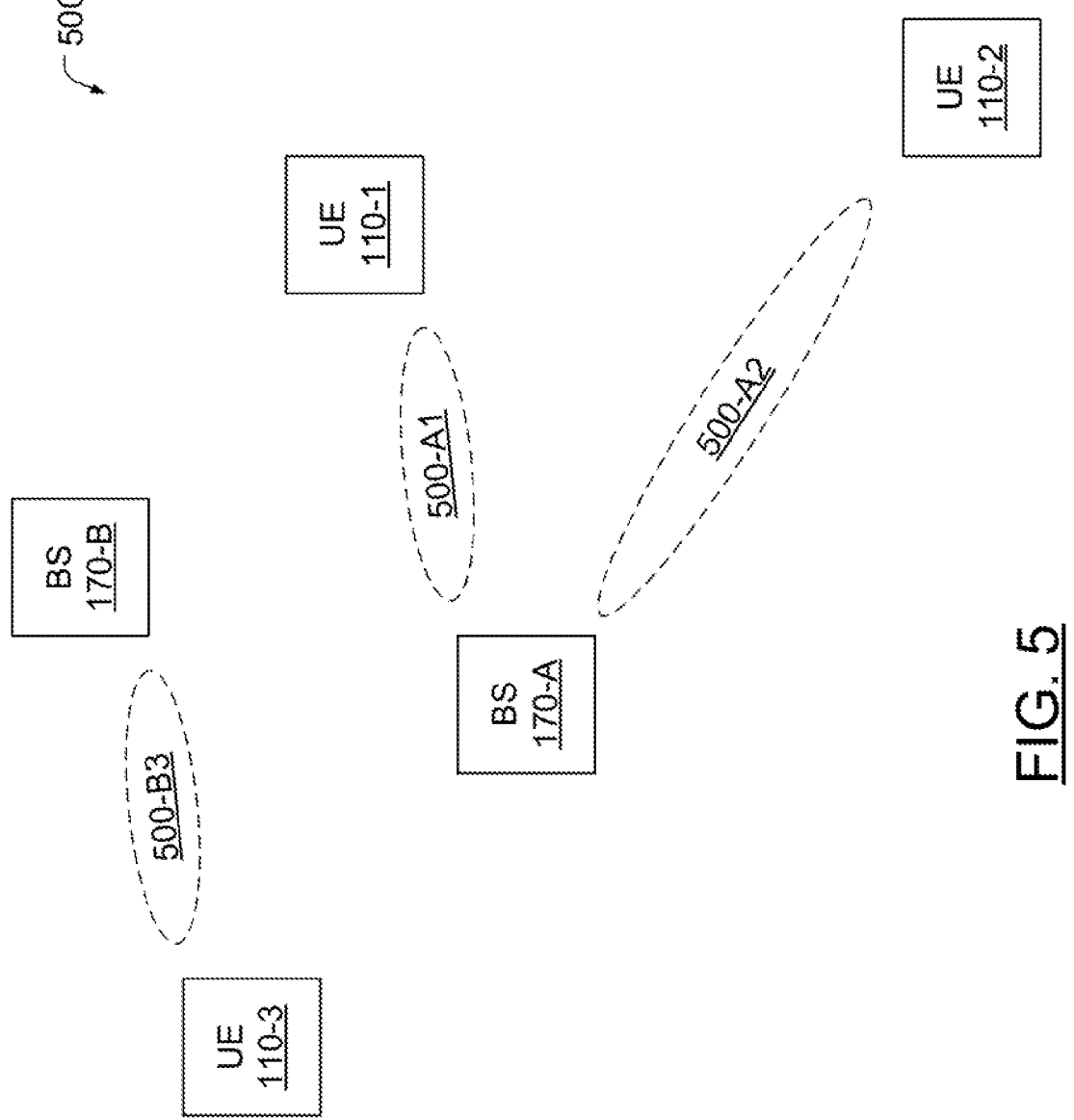
Figure 6:
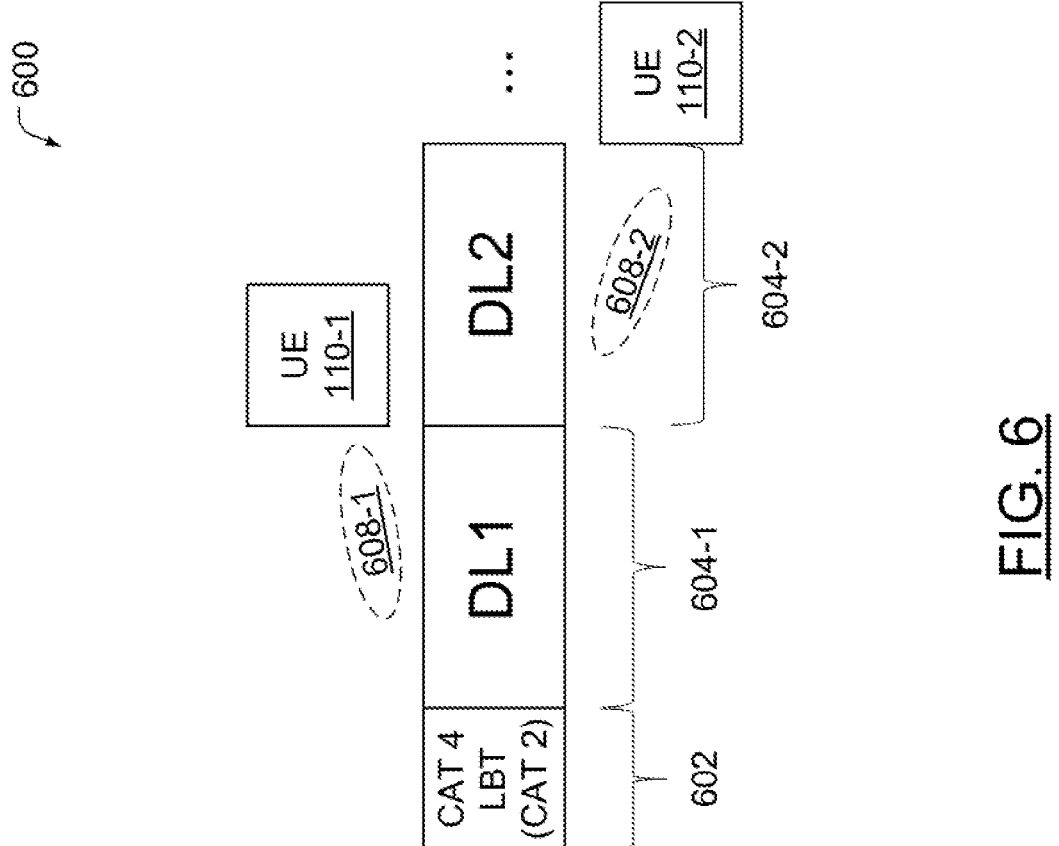
Figure 7:
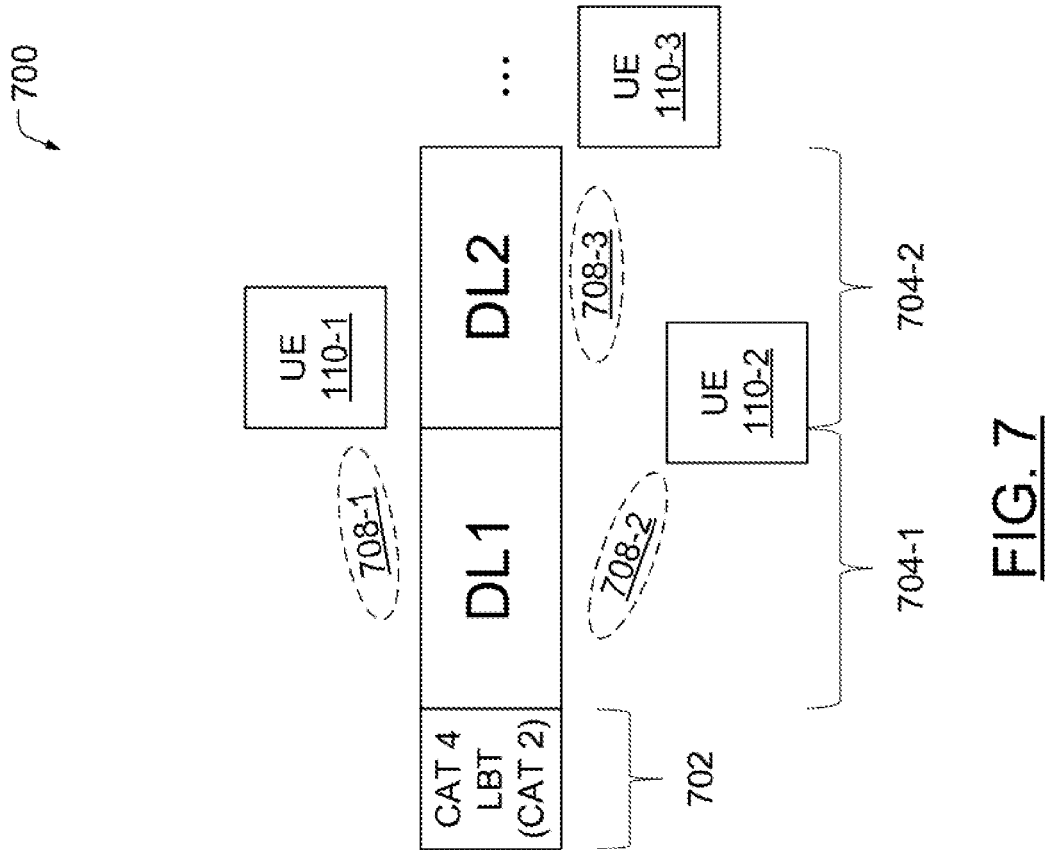
Figure 8:
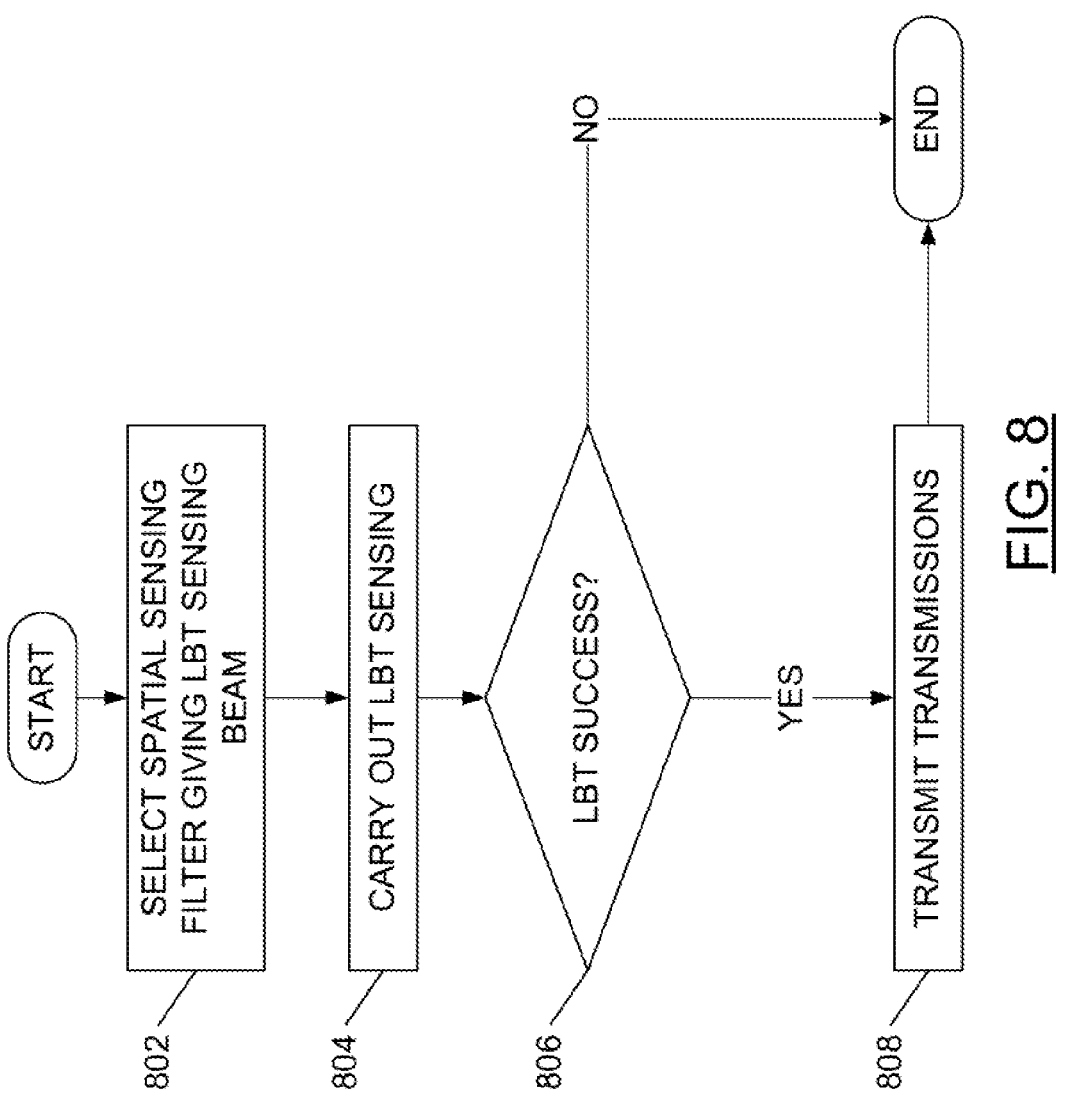
Figure 9:
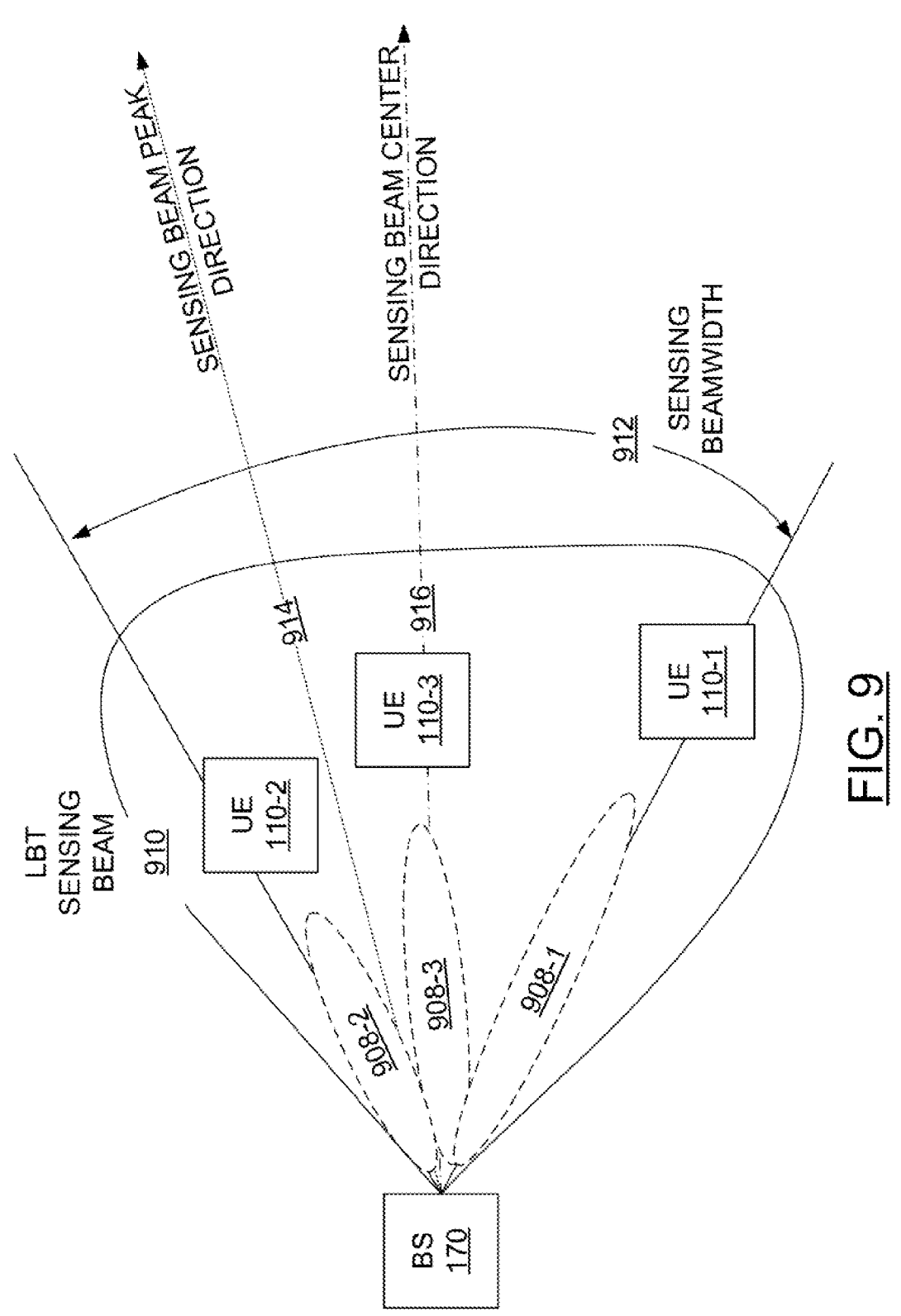
Figure 10:
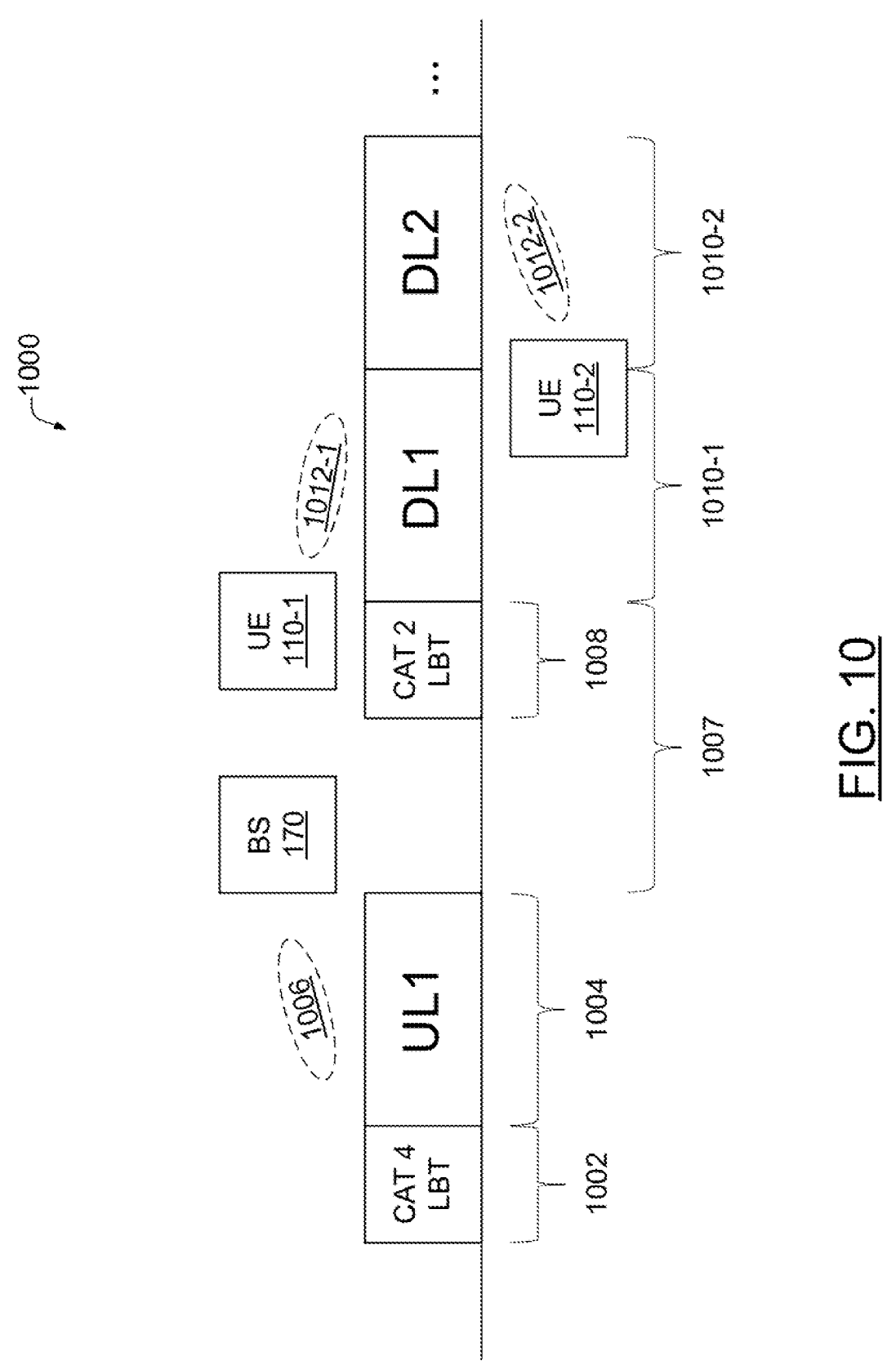
Figure 11:
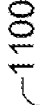
Figure 11:
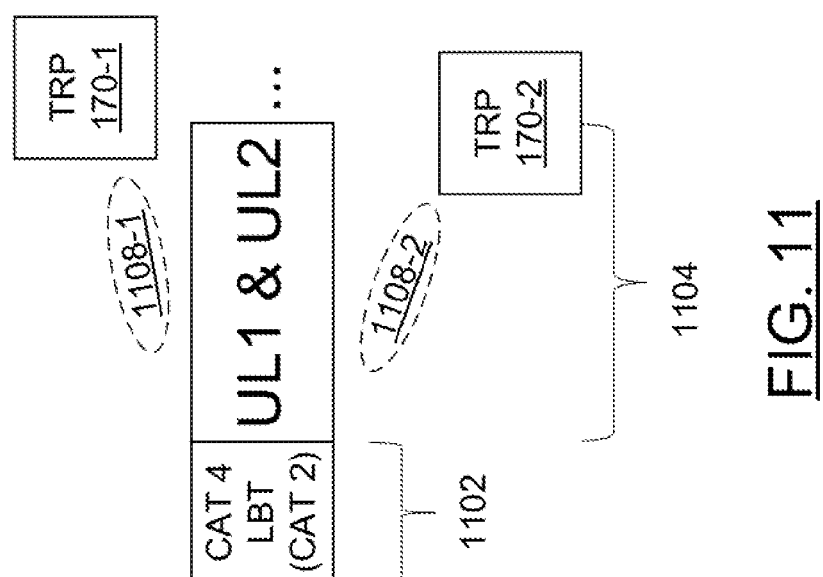
Figure 12:
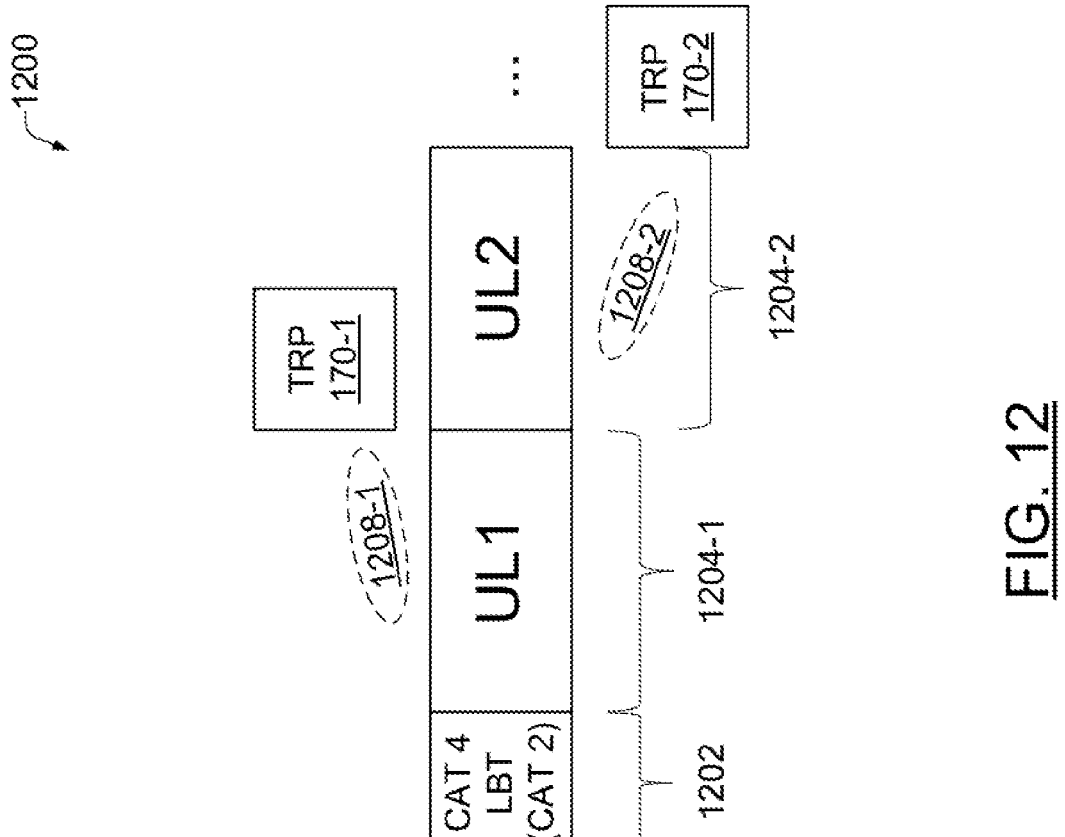

4 made, by way of example, to the following descriptions taken in conjunction with the accompanying drawings, in which:

FIG. 1 illustrates, in a schematic diagram, a communication system in which embodiments of the disclosure may occur, the communication system includes multiple example electronic devices and multiple example transmit receive points along with various networks;

FIG. 2 illustrates, in a block diagram, the communication system of FIG. 1, the communication system includes multiple example electronic devices, an example terrestrial transmit receive point and an example non-terrestrial transmit receive point along with various networks;

FIG. 3 illustrates, as a block diagram, elements of an example electronic device of FIG. 2, elements of an example terrestrial transmit receive point of FIG. 2 and elements of an example non-terrestrial transmit receive point of FIG. 2, in accordance with aspects of the present application;

FIG. 4 illustrates, as a block diagram, various modules that may be included in an example electronic device, an example terrestrial transmit receive point and an example non-terrestrial transmit receive point, in accordance with aspects of the present application;

FIG. 5 illustrates a network in which a first base and a second base station co-exist with three user equipment devices;

FIG. 6 illustrates an initial portion of a channel occupancy time, in accordance with an aspect of the present application;

FIG. 7 illustrates an initial portion of a channel occupancy time, in accordance with an aspect of the present application;

FIG. 8 illustrates example steps in a method of operating a device in a millimeter wave shared spectrum mobile communication network, in accordance with an aspect of the present application;

FIG. 9 illustrates a scenario in which a base station is to transmit, within a particular channel occupancy time, downlink transmissions to a first user equipment, a second user equipment and a third user equipment, including indications of beam directions for the downlink transmissions and indications of a listen-before-talk sensing beam attributes, in accordance with an aspect of the present application;

FIG. 10 illustrates an initial portion of a channel occupancy time, in accordance with an aspect of the present application;

FIG. 11 illustrates an initial portion of a channel occupancy time, in accordance with an aspect of the present application; and FIG. 12 illustrates an initial portion of a channel occupancy time, in accordance with an aspect of the present application.

DETAILED DESCRIPTION

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BS s) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over an non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The non-terrestrial air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120*a* and 120*b* are in communication with the core network 130 to provide the EDs 110*a*, 110*b*, 110*c* with various services such as voice, data and other services. The RANs 120*a* and 120*b* and/or the core network 130 may be in direct or indirect communication with one or more other RANs (not shown), which may or may not be directly served by core network 130 and may, or may not, employ the same radio access technology as RAN 120*a*, RAN 120*b* or both. The core network 130 may also serve as a gateway access between (i) the RANs 120*a* and 120*b* or the EDs 110*a*, 110*b*, 110*c* or both, and (ii) other networks (such as the PSTN 140, the Internet 150, and the other networks 160). In addition, some or all of the EDs 110*a*, 110*b*, 110*c* may include functionality for communicating with different wireless networks over different wireless links using different wireless technologies and/or protocols. Instead of wireless communication (or in addition thereto), the EDs 110*a*, 110*b*, 110*c* may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110*a*, 110*b*, 110*c* may be multimode devices capable of operation according to multiple radio access technologies and may incorporate multiple transceivers necessary to support such.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170*a* and 170*b* each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output, "MIMO," precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE). The following are some examples for the above components.

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak to Average Power Ratio Waveform (low PAPR WF).

A frame structure component may specify a configuration of a frame or group of frames. The frame structure component may indicate one or more of a time, frequency, pilot signature, code or other parameter of the frame or group of frames. More details of frame structure will be discussed hereinafter.

A multiple access scheme component may specify multiple access technique options, including technologies defining how communicating devices share a common physical channel, such as: TDMA; FDMA; CDMA; SDMA; SC-FDMA; Low Density Signature Multicarrier CDMA (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources; and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all" concept. For example, it may be that the components within the air interface cannot be changed or adapted once the air interface is defined. In some implementations, only limited parameters or modes of an air interface, such as a cyclic prefix (CP) length or a MIMO mode, can be configured. In some embodiments, an air interface design may provide a unified or flexible framework to support frequencies below known 6 GHz bands and frequencies beyond the 6 GHz bands (e.g., mmWave bands) for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain and a frequency domain self-contained design may support more flexible RAN slicing through channel resource sharing between different services in both frequency and time.

A frame structure is a feature of the wireless communication physical layer that defines a time domain signal transmission structure to, e.g., allow for timing reference and timing alignment of basic time domain transmission units. Wireless communication between communicating devices may occur on time-frequency resources governed by a frame structure. The frame structure may, sometimes, instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource contemporaneously.

One example of a frame structure is a frame structure, specified for use in the known long-term evolution (LTE) cellular systems, having the following specifications: each frame is 10 ms in duration; each frame has 10 subframes, which subframes are each 1 ms in duration; each subframe includes two slots, each of which slots is 0.5 ms in duration; each slot is for the transmission of seven OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD is specified as the integer time of OFDM symbol duration.

Another example of a frame structure is a frame structure, specified for use in the known new radio (NR) cellular systems, having the following specifications: multiple subcarrier spacings are supported, each subcarrier spacing corresponding to a respective numerology; the frame structure depends on the numerology but, in any case, the frame length is set at 10 ms and each frame consists of ten subframes, each subframe of 1 ms duration; a slot is defined as 14 OFDM symbols; and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing, the slot length is 1 ms and, for 30 kHz subcarrier spacing, the slot length is 0.5 ms. The NR frame structure may have more flexibility than the LTE frame structure.

Another example of a frame structure is, e.g., for use in a 6G network or a later network. In a flexible frame structure, a symbol block may be defined to have a duration that is the minimum duration of time that may be scheduled in the flexible frame structure. A symbol block may be a unit of transmission having an optional redundancy portion (e.g., CP portion) and an information (e.g., data) portion. An OFDM symbol is an example of a symbol block. A symbol block may alternatively be called a symbol. Embodiments of flexible frame structures include different parameters that may be configurable, e.g., frame length, subframe length, symbol block length, etc. A non-exhaustive list of possible configurable parameters, in some embodiments of a flexible frame structure, includes: frame length; subframe duration; slot configuration; subcarrier spacing (SCS); flexible transmission duration of basic transmission unit; and flexible switch gap.

The frame length need not be limited to 10 ms and the frame length may be configurable and change over time. In some embodiments, each frame includes one or multiple downlink synchronization channels and/or one or multiple downlink broadcast channels and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set to 5 ms for autonomous vehicle applications. As another example, smart meters on houses may not require fast initial access, in which case the frame length may be set as 20 ms for smart meter applications.

A subframe might or might not be defined in the flexible frame structure, depending upon the implementation. For example, a frame may be defined to include slots, but no subframes. In frames in which a subframe is defined, e.g., for time domain alignment, the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

A slot might or might not be defined in the flexible frame structure, depending upon the implementation. In frames in which a slot is defined, then the definition of a slot (e.g., in time duration and/or in number of symbol blocks) may be configurable. In one embodiment, the slot configuration is common to all UEs 110 or a group of UEs 110. For this case, the slot configuration information may be transmitted to the UEs 110 in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration may be transmitted independently from the frame configuration signaling and/or subframe configuration signaling. In general, the slot configuration may be system common, base station common, UE group common or UE specific.

The SCS may range from 15 KHz to 480 KHz. The SCS may vary with the frequency of the spectrum and/or maximum UE speed to minimize the impact of Doppler shift and phase noise. In some examples, there may be separate transmission and reception frames and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g., if more flexible symbol durations are implemented using inverse discrete Fourier transform (IDFT) instead of fast Fourier transform (FFT). Additional examples of frame structures can be used with different SCSs.

The basic transmission unit may be a symbol block (alternatively called a symbol), which, in general, includes a redundancy portion (referred to as the CP) and an information (e.g., data) portion. In some embodiments, the CP may be omitted from the symbol block. The CP length may be flexible and configurable. The CP length may be fixed within a frame or flexible within a frame and the CP length may possibly change from one frame to another, or from one group of frames to another group of frames, or from one subframe to another subframe, or from one slot to another slot, or dynamically from one scheduling to another scheduling. The information (e.g., data) portion may be flexible and configurable. Another possible parameter relating to a symbol block that may be defined is ratio of CP duration to information (e.g., data) duration. In some embodiments, the symbol block length may be adjusted according to: a channel condition (e.g., multi-path delay, Doppler); and/or a latency requirement; and/or an available time duration. As another example, a symbol block length may be adjusted to fit an available time duration in the frame.

A frame may include both a downlink portion, for downlink transmissions from a base station 170, and an uplink portion, for uplink transmissions from the UEs 110. A gap may be present between each uplink and downlink portion, which gap is referred to as a switching gap. The switching gap length (duration) may be configurable. A switching gap duration may be fixed within a frame or flexible within a frame and a switching gap duration may possibly change from one frame to another, or from one group of frames to another group of frames, or from one subframe to another subframe, or from one slot to another slot, or dynamically from one scheduling to another scheduling.

A device, such as a base station 170, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center frequency, the lowest frequency or the highest frequency of the carrier. A carrier may be on a licensed spectrum or an unlicensed spectrum. Wireless communication with the device may also, or instead, occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and, optionally, one or multiple uplink resources. A cell may include one or multiple uplink resources and, optionally, one or multiple downlink resources. A cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may, instead or additionally, include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP or a carrier may have a bandwidth of 80 MHz and consist of two adjacent contiguous BWPs, etc. In other embodiments, a BWP may have one or more carriers, e.g., a BWP may have a bandwidth of 40 MHz and consist of two adjacent contiguous carriers, where each carrier has a bandwidth of 20 MHz. In some embodiments, a BWP may comprise non-contiguous spectrum resources, which consists of multiple non-contiguous multiple carriers, where the first carrier of the non-contiguous multiple carriers may be in the mmW band, the second carrier may be in a low band (such as the 2 GHz band), the third carrier (if it exists) may be in THz band and the fourth carrier (if it exists) may be in visible light band. Resources in one carrier which belong to the BWP may be contiguous or non-contiguous. In some embodiments, a BWP has non-contiguous spectrum resources on one carrier.

The carrier, the BWP or the occupied bandwidth may be signaled by a network device (e.g., by a base station 170) dynamically, e.g., in physical layer control signaling such as the known downlink control channel (DCI), or semi-statically, e.g., in radio resource control (RRC) signaling or in signaling in the medium access control (MAC) layer, or be predefined based on the application scenario; or be determined by the UE 110 as a function of other parameters that are known by the UE 110, or may be fixed, e.g., by a standard.

Going to the future wireless network, the number of the new devices could be increased exponentially with diverse functionalities. Also, a lot more new applications and use cases than those associated with 5G may emerge with more diverse quality of service demands. These use cases will result in new key performance indications (KPIs) for the future wireless networks (for an example, 6G network) that can be extremely challenging. It follows that sensing technologies and artificial intelligence (AI) technologies, especially machine learning (ML) and deep learning technologies, are being introduced to telecommunication for improving the system performance and efficiency.

AI/ML technologies may be applied to communication systems. In particular AI/ML technologies may be applied to communication in Physical layer and to communication in media access control (MAC) layer.

For the physical layer, the AI/ML technologies may be employed to optimize component design and improve algorithm performance. For example, AI/ML technologies may be applied to channel coding, channel modelling, channel estimation, channel decoding, modulation, demodulation, MIMO, waveform, multiple access, PHY element parameter optimization and update, beam forming and tracking and sensing and positioning, etc.

For the MAC layer, AI/ML technologies may be utilized in the context of learning, predicting and making decisions to solve complicated optimization problems with better strategy and optimal solution. For one example, AI/ML technologies may be utilized to optimize the functionality in MAC for, e.g., intelligent TRP management, intelligent beam management, intelligent channel resource allocation, intelligent power control, intelligent spectrum utilization, intelligent modulation and coding scheme selection, intelligent HARQ strategy, intelligent transmit/receive mode adaption, etc.

AI/ML architectures usually involve multiple nodes. The multiple nodes can be organized in two modes, i.e., a centralized mode and a distributed mode, both of which modes can be deployed in an access network, a core network or an edge computing system or third network. A centralized training and computing architecture is restricted by communication overhead and strict user data privacy. Distributed training and computing architecture may be organized according to several frameworks, e.g., distributed machine learning and federated learning. AI/ML architectures include an intelligent controller, which can perform as a single agent or as a multi-agent, based on joint optimization or individual optimization. New protocols and signaling mechanisms may be established so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, tracking, autonomous delivery and mobility. Terrestrial network-based sensing and non-terrestrial network-based sensing could provide intelligent context-aware networks to enhance the UE experience. For an example, terrestrial network-based sensing and non-terrestrial network-based sensing may be shown to provide opportunities for localization applications and sensing applications based on new sets of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial networks and in non-terrestrial networks, the measured channel data and sensing and positioning data can be obtained by large bandwidth, new spectrum, dense network and more light-of-sight (LOS) links. Based on these data, a radio environmental map can be drawn through AI/ML methods, where channel information is linked, in the map, to its corresponding positioning, or environmental information, to, thereby, provide an enhanced physical layer design based on this map.

Sensing coordinators are nodes in a network that can assist in the sensing operation. These nodes can be stand-alone nodes dedicated to just sensing operations or other nodes (for example, the T-TRP 170, the ED 110, or a node in the core network 130) doing the sensing operations in parallel with communication transmissions. New protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored and exchanged. The characteristics of wireless data are known to expand to large ranges in multiple dimensions, e.g., from sub-6 GHz, millimeter to Terahertz carrier frequency, from space, outdoor to indoor scenario, and from text, voice to video. These data are collecting, processing and usage are performed in a unified framework or a different framework.

A terrestrial communication system may also be referred to as a land-based or ground-based communication system, although a terrestrial communication system can also, or instead, be implemented on or in water. The non-terrestrial communication system may bridge coverage gaps in underserved areas by extending the coverage of cellular networks through the use of non-terrestrial nodes, which will be key to establishing global, seamless coverage and providing mobile broadband services to unserved/underserved regions. In the current case, it is hardly possible to implement terrestrial access-points/base-stations infrastructure in areas like oceans, mountains, forests, or other remote areas.

The terrestrial communication system may be a wireless communications system using 5G technology and/or later generation wireless technology (e.g., 6G or later). In some examples, the terrestrial communication system may also accommodate some legacy wireless technologies (e.g., 3G or 4G wireless technology). The non-terrestrial communication system may be a communications system using satellite constellations, like conventional GeoStationary Orbit (GEO) satellites, which utilize broadcast public/popular contents to a local server. The non-terrestrial communication system may be a communications system using low earth orbit (LEO) satellites, which are known to establish a better balance between large coverage area and propagation path-loss/delay. The non-terrestrial communication system may be a communications system using stabilized satellites in very low earth orbits (VLEO) technologies, thereby substantially reducing the costs for launching satellites to lower orbits. The non-terrestrial communication system may be a communications system using high altitude platforms (HAPs), which are known to provide a low path-loss air interface for the users with limited power budget. The non-terrestrial communication system may be a communications system using Unmanned Aerial Vehicles (UAVs) (or unmanned aerial system, "UAS") achieving a dense deployment, since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs may be coupled to integrate satellite communications to cellular networks. Emerging 3D vertical networks consist of many moving (other than geostationary satellites) and high altitude access points such as UAVs, HAPs and VLEOs.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and users and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or a Rx beam independently.

A beam may be formed by performing amplitude and/or phase weighting on data transmitted or received by at least one antenna port. A beam may be formed by using another method, for example, adjusting a related parameter of an antenna unit. The beam may include a Tx beam and/or a Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or a SSB resource identifier, or a sounding reference signal (SRS) resource identifier, or other reference signal resource identifier.

The frequency band extending from 57 GHz to 66 GHz is known to be largely available in regions such as the USA, Canada, the European Union (EU) and Japan. The same range is known to be partially available in other regions, such as China, South Korea and Australia. The frequency band extending from 57 GHz to 71 GHz is available in the USA and Canada. Based on the recent decisions of the European Conference of Postal and Telecommunications Administrations, Electronic Communications Committee (CEPT ECC), the frequency band extending from 57 GHz to 71 GHz will also be available in the EU.

In the requirements set out by the International Telecommunications Union (ITU-R) for Multiple Gigabit Wireless Systems (MGWS) operating in the 60 GHz band, a maximum channel bandwidth of 2.16 GHz is considered and bonding of channels is allowed. The European Telecommunications Standards Institute (ETSI) specified the regulatory requirements for MGWS operating in the 60 GHz band excluding fixed outdoor installations (see ETSI EN 302 567, "Multiple-Gigabit/s radio equipment operating in the 60 GHz band; Harmonised Standard covering the essential requirements of article 3.2 of Directive 2014/53/EU," V2.1.1, 2017 July).

Therefore, the 802.11ad Directional Multi-Gigabit (DMG) and 802.11ay Enhanced DMG (EDMG) support channel bonding of contiguous channels and/or aggregation of non-contiguous channels, thereby rendering the following possible transmission bandwidths of a Physical Protocol Data Unit (PPDU): 2.16 GHz; 4.32 GHz; 6.48 GHz; 8.64 GHz; 2.16+2.16 GHz; and 4.32+4.32 GHz.

Through a review of current, region-specific regulatory requirements, it can be observed that a minimum Occupied Channel Bandwidth (OCB) containing 99% of the power of the signal is not required in the US region and the China region. This is also the case for Japan, South Korea, Australia and Singapore. Whereas, in the EU, the OCB is required to be between 70% and 100% of the declared Nominal Channel Bandwidth according to the Harmonized Standard (HS) for both MGWS and Wideband Data Transmission Systems for fixed network radio equipment (WDTS-fixed, see ETSI EN 303 722, V0.0.4, 2020 May 2018). Notably, for MGWS, there is no requirement on the nominal center frequencies and nominal channel bandwidth. A given manufacturer can declare a nominal channel bandwidth when a product is tested. Nevertheless, 802.11 DMG/ EDMG systems currently support multiples of 2.16 GHz channels (i.e., 2.16 GHz, 4.32 GHz, 6.48 GHz and 8.64 GHz).

For the MGWS, the maximum Power Spectral Density (PSD) has been relaxed from 13 dBm/MHz to 23 dBm/MHz by the latest CEPT ECC decisions. Together with the total Radio Frequency (RF) Effective Isotropic Radiated Power (EIRP) limit of 40 dBm, the minimum transmission bandwidth (BW) using full power is determined to be 50 MHz. A transmitting device can, thus, increase the transmission BW at the expense of reducing the PSD below the maximum PSD. It is also noted that a higher PSD limit is allowed for WDTS-fixed given that a high antenna gain ($\geq$30 dBi) is used at transmission.

A contention-based protocol is a communications protocol for operating wireless telecommunication equipment that allows many users to use the same radio channel without pre-coordination. The "listen before talk" (LBT) protocol is a contention-based protocol by which an equipment applies Clear Channel Assessment (CCA) before using the channel. The known Carrier Sense Multiple Access/Collision Avoidance (CSMA/CA) operating procedure in IEEE 802.11 is the most well-known form of LBT contention-based protocol.

LBT is mandatory in the EU for MGWS under a category called "Adaptivity" as a medium access protocol to facilitate spectrum sharing through energy-detection based CCA. LBT has not been mandated yet in the EU for fixed outdoor deployments of Wideband Data Transmission Systems (WDTS-fixed). Regions where LBT is not mandatory include the US, China, Japan, South Korea, Australia and Singapore. Currently, there are two ongoing work items (WIs) in the ETSI Broadband Radio Access Networks (BRAN) technical committee, including a WI for specifying the channel access mechanism (Adaptivity) for Fixed Network Radio Equipment and Mobile Network Radio Equipment operating in the frequency band that extends from 57 GHz to 71 GHz.

In the meeting known by the name RAN1 #104-*e*, it was agreed that, for a channel occupancy time (COT) with space division multiplexing (SDM) of transmission beams or a COT with time division multiplexing (TDM) of transmission beams with beam switching, a single, wide LBT sensing beam that "covers" all transmission beams could be used in the COT. The LBT can be performed using an appropriate energy detection (ED) threshold. It was left to further study the details on the definition of "cover." That is, it was left, for further study, how to establish that a particular wide LBT sensing beam "covers" a specific set of transmission beams.

It is known that LBT, as a spectrum sharing mechanism, is meant to assess whether or not subsequent transmissions are allowed. It is well established that the interference impact of such subsequent transmissions varies significantly, depending on the associated transmission beams. It follows that selecting spatial properties for the wide LBT sensing beam should be done in the context of the subsequent transmission beams to assess whether or not the channel is clear in these intended transmission directions. To select spatial properties for the wide LBT sensing beam without the context of the subsequent transmission beams may be shown to lead to a CCA result that is unreliable. Furthermore, under such conditions distinct devices would have unpredictable behavior, even under the same interference conditions.

Therefore, it proposed herein that, when an LBT procedure is mandated as the spectrum sharing mechanism in a given region, the LBT procedure should be unified across networks of the same RAT, thereby promoting fair inter-operator coexistence. It follows that the LBT sensing beam selection procedure should be well-specified and not merely left as an implementation detail. Moreover, an established, well-specified LBT sensing beam selection procedure may be shown to be important to evaluations of inter-RAT coexistence.

Therefore, aspects of the present application relate to selecting a spatial sensing filter that results in an LBT sensing beam. The spatial sensing filter is proposed to be selected such that a specific spatial relationship may be achieved between the resultant LBT sensing beam and beams that are to be used for subsequent transmissions. Such spatial sensing filter selecting may find use, for example, for operation in the 60 GHz band.

Notably, current technical specifications for physical layer procedures are silent on describing spatial properties of a transmission (TX) beam or the spatial properties of a reception (RX) beam.

In contrast, current technical specifications propose, for DL reception, using a particular spatial RX filter for receiving an associated DL Reference Signal (RS), e.g., an SSB or a CSI-RS. The particular spatial RX filter may be indicated to, and/or configured for, the UE 110 by a given BS 170 on the basis, e.g., of a quasi-co-location (QCL) relationship.

Current technical specifications propose, for UL transmission, using a particular spatial TX filter for transmitting an associated UL RS, e.g., an SRS, or using the same spatial RX filter used for receiving the associated DL RS. The spatial association may be indicated to, and/or configured for, the UE 100 by a given BS 170 on the basis, e.g., of spatial relation information.

This current approach can be used to specify a spatial sensing filter of an LBT sensing beam before a single UL/DL directional transmission (see U.S. Provisional Application No. 63/094,136).

That approach cannot be used, however, to specify a wide LBT sensing beam that "covers" a set of future multiplexed transmission beams in different directions. This is due to the consideration that it may be infeasible to define an RS that is QCLed with, or spatially related to, each RS associated with an individual subsequent transmission direction for any arbitrary set of multiplexed transmission beams.

It is noted that two antenna ports are said to be quasi co-located (QCLed) if properties of the channel over which a symbol on one antenna port is conveyed can be inferred from analysis of a reference signal received over the channel over which a symbol on the other antenna port has been conveyed.

The manner in which a quasi-co-location relationship is defined for antenna ports used for the transmission of certain DL channels/signals and the manner in which these QCL relationships may be configured and dynamically indicated are defined, in TS 38.214 v16.5.0, as follows. The UE can be configured with a list of up to M Transmission Configuration Indicator State (TCI-State) configurations within the known higher layer parameter PDSCH-Config to decode PDSCH according to a detected PDCCH with DCI intended for the UE and the given serving cell. The limit, M, depends on the UE capability maxNumberConfiguredTClstates-PerCC. Each TCI-State contains parameters for configuring a quasi-co-location relationship between one or two downlink reference signals and the demodulation reference signal (DMRS) ports of the PDSCH, the DMRS port of PDCCH or the CSI-RS port(s) of a CSI-RS resource. The quasi-co-location relationship is configured by the higher layer parameter qcl-Type1 for the first DL RS, and qcl-Type2 for the second DL RS (if configured). For the case of two DL RSs, the QCL types (qcl-Type1 and qcl-Type2) shall not be the same, regardless of whether the references are to the same DL RS or different DL RSs. The quasi-co-location types corresponding to each DL RS are given by the higher layer parameter qcl-Type in QCL-Info and may take one of the following values: "typeA" {Doppler shift, Doppler spread, average delay, delay spread}; "typeB" {Doppler shift, Doppler spread}; "typeC" {Doppler shift, average delay}; and "typeD" {Spatial Rx parameter}.

Notably, a first reference signal is considered to be QCLed to a second reference signal if the first reference signal is in the same "TCI chain" as the second reference signal, provided that the number of Reference Signals in the TCI chain is no more than four. It is assumed that there is single QCL type per TCI chain. A TCI chain includes an SSB and one or more CSI-RS resources. The TCI state of each Reference Signal includes another Reference Signal in the same TCI chain. The DMRS of PDCCH or PDSCH is QCLed with the reference signal in its active TCI state and any other reference signal that is QCLed, based on above criteria, with the reference signal in the active TCI state.

In a network 500 illustrated in FIG. 5, a first BS 170-A and a second BS 170-B co-exist. The network further includes a first UE 110-1, a second UE 110-2 and a third UE 110-3. It is considered that there may be an ongoing transmission from the second BS 170-B to the third UE 110-3. The ongoing transmission is illustrated as using a transmit beam identified with reference numeral 500-B3. It is further considered that the first BS 170-A may plan for a transmission to the first UE 110-1 and a transmission to the second UE 110-2. Ahead of such planned transmissions, the first BS 170-A may implement omni-directional LBT sensing. It is understood that such omni-directional LBT sensing would detect the ongoing transmission using the transmit beam identified with reference numeral 500-B3. Accordingly, the first BS 170-A may be expected to delay transmission on the basis of such detecting. Such delaying may be viewed as unnecessary, because the planned transmissions using a transmit beam identified with reference numeral 500-A1 and the planned transmissions using a transmit beam identified with reference numeral 500-A2 are unlikely to interfere with the ongoing transmissions using the transmit beam identified with reference numeral 500-B3.

Rather than using omni-directional LBT sensing, it appears that it would be prudent to select a wide LBT sensing beam that only "covers" transmission beams 500-A1 and 500-A2. Directional LBT sensing that employs a wide LBT sensing beam may also be known as quasi-omni-directional LBT.

It has been mentioned, hereinbefore, that the known approach of configuring/indicating QCL or spatial relation information cannot be used to select a wide LBT sensing beam that "covers" multiplexed transmission beams in different directions. This has been mentioned as being due to the consideration that it may be infeasible to define an RS that is QCLed with, or spatially related to, each RS associated with an individual subsequent transmission direction for any arbitrary set of multiplexed beams.

In overview, aspects of the present application relate to selecting a spatial sensing filter that results in an LBT sensing beam. The spatial sensing filter is proposed to be selected such that a specific spatial relationship may be achieved between the resultant LBT sensing beam and beams that are to be used for subsequent transmissions.

In TS 38.104 v17.0.0 "NR; Base Station (BS) radio transmission and reception," the following transmit-beam-related spatial attributes or properties have been defined.

"Beam" is a spatial attribute of a transmit beam. "Beam" is defined as relating to the main lobe of a radiation pattern (an "antenna pattern") of a given antenna array from which the transmit beam is transmitted. Notably, for antenna arrays at a given BS 170, there may be more than one beam.

"Beam center direction" is a spatial attribute of a transmit beam that relates to a direction representative of the geometric center of a half-power contour of the transmit beam.

"Beam peak direction" is a spatial attribute of a transmit beam that relates to a direction at which a maximum EIRP may be found.

"Beam direction pair" is a spatial attribute of a transmit beam that relates to a data set including the beam center direction and the beam peak direction for the same transmit beam.

"Beamwidth" is a spatial attribute of a transmit beam that applies to a beam that may be described as having a half-power contour represented by an ellipse with a major axis and a minor axis. There is an antenna pattern cut that contains the major axis and an antenna pattern cut that contains the minor axis. The "beamwidth" relates to the half-power beamwidths in the two antenna pattern cuts that respectively contain the major and minor axis of the ellipse.

Aspects of the present application relate to criteria for selecting a spatial sensing filter that results in a selected LBT sensing beam. The selecting may be based on at least some of the above spatial attributes to establish a spatial relationship between the selected LBT sensing beam and a plurality of transmission beams for subsequent transmissions. The subsequent transmissions may be multiplexed using SDM, multiplexed using TDM or multiplexed using both SDM and TDM.

In DL, a BS may perform directional LBT sensing using a selected spatial sensing filter to access one or more unlicensed channels and to transmit transmissions in a same serving cell in different directions or to different UEs, wherein at least two transmissions are not QCLed with each other in terms of spatial transmit parameters or wherein at least two transmissions are associated with different TCI chains.

In UL, a UE may perform directional LBT sensing using a selected spatial sensing filter to access one or more unlicensed channels and to transmit transmissions to different TRPs in a single serving cell or to different TRPs in multiple different serving cells, wherein the UE is configured with different TCI states, e.g., a different spatial relation associated to a DL RS or a corresponding UL RS for each TRP.

FIG. 6 illustrates an initial portion 600 of a COT. The initial portion 600 begins with an LBT time period 602 in which a BS 170 performs an LBT sensing procedure. The initial portion 600 continues with the BS 170 transmitting, upon determining LBT success (e.g., defined as detected energy not exceeding an energy detection threshold), a plurality of DL transmissions, including, in a first transmission time period 604-1, a first DL transmission and, in a second transmission time period 604-2, a second DL transmission. In the first transmission time period 604-1, the BS 170 transmits the first DL transmission, to a first UE 110-1, using a first transmission beam 608-1. In the second transmission time period 604-2, the BS 170 transmits the second DL transmission, to a second UE 110-2, using a second transmission beam 608-2.

FIG. 7 illustrates an initial portion 700 of a COT. The initial portion 700 begins with an LBT time period 702 in which a BS performs an LBT sensing procedure. The initial portion 700 continues with the BS 170 transmitting, upon determining LBT success, a plurality of DL transmissions, including, in a first transmission time period 704-1, a first DL transmission and a second DL transmission. In the first transmission time period 704-1, the BS transmits the first DL transmission, to a first UE 110-1, using a first transmission beam 708-1 and the second DL transmission, to a second UE 110-2, using a second transmission beam 708-2. In the second transmission time period 704-2, the BS transmits a third DL transmission, to a third UE 110-3, using a third transmission beam 708-3.

In accordance with aspects of the present application, a BS may perform a directional LBT sensing procedure (see the LBT time period 602 in FIG. 6 and LBT time period 702 in FIG. 7) using a spatial sensing filter to initiate a channel occupancy (CO) in an unlicensed channel in accordance with a DL channel access procedure ahead of transmitting a plurality of DL transmissions (see FIGS. 6 and 7). The plurality of DL transmissions may be multiplexed in an SDM manner, multiplexed in a TDM manner or multiplexed in a combination of both an SDM manner and a TDM manner. At least two of the plurality of DL transmissions are not QCLed with each other in terms of spatial transmit parameters, or are associated with different TCI chains. The DL channel access procedure (see the LBT time period 602 in FIG. 6 and LBT time period 702 in FIG. 7) may be a Cat4 (Type 1) procedure. Alternatively, the DL channel access procedure (see the LBT time period 602 in FIG. 6 and LBT time period 702 in FIG. 7) may be a Cat2 (Type 2) procedure if the channel is a "secondary" channel in a Type B multi-channel access procedure.

These aspects of the present application apply to those cases in which the plurality of DL transmissions include SSBs, which are time-domain multiplexed. For instance, the BS may initiate a COT for transmitting a discovery burst (DB). A DB may refer to a DL transmission burst including a set of signals and/or channels confined within a window and associated with a duty cycle. The DB may include at least SSBs. The DB may also include CORESET for PDCCH scheduling PDSCH with system information block 1 (SIB1). The DB may also include PDSCH carrying SIB1 and/or non-zero power CSI reference signals.

These aspects of the present application also apply to a case in which all of the DL transmissions in the plurality of DL transmissions are intended to a single UE that is scheduled but with TCI state switching after the associated delay requirement of TCI state switching and within the COT duration.

These aspects of the present application also apply to a case in which a subset of the DL transmissions in the plurality of DL transmissions are intended to a single UE that is scheduled but with TCI state switching after the associated delay requirement of TCI state switching and within the COT duration.

FIG. 8 illustrates example steps in a method of operating a device in a millimeter wave shared spectrum mobile communication network. The method includes the device selecting (step 802) a spatial sensing filter that results in a selected LBT sensing beam, wherein the selecting includes determining a spatial relationship between the selected LBT sensing beam and a plurality of transmission beams to be used for a corresponding plurality of subsequent transmissions. It is to be understood that at least two transmissions among the corresponding plurality of subsequent transmissions are not quasi-co-located with each other. It is to be alternatively understood that at least two transmissions among the corresponding plurality of subsequent transmissions are associated with different Transmission Configuration Indicator (TCI) chains. The device then carries out (step 804) an LBT procedure using the selected spatial sensing filter. Upon determining (step 806) LBT success, the device then transmits (step 808) the plurality of subsequent transmissions. Upon determining (step 806) that the LBT has been unsuccessful, based on, for example, detected energy exceeding an energy detection threshold, the method may end without further transmissions from the device. Upon determining (step 806) LBT success, the device may, optionally, transmit (not shown) a transmission using the selected LBT sensing beam. Upon determining (step 806) LBT success, the device may, optionally, transmit (not shown) a transmission that includes an indication of the selected LBT beam.

An example of beams resulting from implementing the method illustrated in FIG. 8 is illustrated in FIG. 9. In particular, FIG. 9 illustrates a scenario in which a BS 170 is to transmit (step 808), within a particular COT, DL transmissions to a first UE 110-1, a second UE 110-2 and a third UE 110-3. The BS has selected a first transmission beam 908-1 for transmissions to the first UE 110-1. The BS has selected a second transmission beam 908-2 for transmissions to the second UE 110-2. The BS has selected a third transmission beam 908-3 for transmissions to the third UE 110-3. Each of the transmission beams 908-1, 908-2, 908-3 may be understood to have an associated beam peak direction (not specifically referenced in FIG. 9).

The BS selects (step 802) a spatial sensing filter that results in a selected LBT sensing beam 910. When selecting (step 802) the spatial sensing filter, the BS may select a spatial sensing filter such that the resultant selected LBT sensing beam 910 minimizes a sensing beamwidth 912. While minimizing the sensing beamwidth 912 of the selected LBT sensing beam, it should be maintained that the sensing beamwidth 912, at least, contains all beam peak directions of the transmission beams 908-1, 908-2, 908-3 associated with the subsequent DL transmissions within the particular COT. Conveniently, minimizing the sensing beamwidth 912 of the selected LBT sensing beam may be seen to increase channel access probability and/or spatial reuse opportunities. As a performance requirement or for compliance testing, a margin, θ≥0, for the selected sensing beamwidth 912 can be defined. The margin may also be considered as an absolute or a relative sensing beamwidth accuracy requirement. For example, in a test scenario, the set of beam peak directions of the transmission beams 908-1, 908-2, 908-3 associated with the subsequent DL transmissions may be a subset of an Over The Air (OTA) peak directions set declared for the device under test (the BS 170, in this example). The OTA peak directions set is a set of beam peak directions for which the EIRP accuracy requirement is intended to be met. If the largest relative angle between the beam peak directions, i.e., of the transmission beams 908-1 and 908-2, is denoted as β, then the selected LBT sensing beamwidth 912 should be bounded by the values β and β+θ. The selected LBT sensing beamwidth 912 may be tested when the device under test transmits a pre-defined reference channel/signal using a spatial transmit filter that is the same as the selected spatial sensing filter for the LBT sensing beam.

The sensing beamwidth 912 may be defined based on some value, X, of dB below a sensing beam peak gain, wherein X is a pre-defined parameter or a configurable parameter. In the condition wherein X=3 the beamwidth may be referenced as the "half-power" beamwidth.

While minimizing the sensing beamwidth 912 of the selected LBT sensing beam, the resulting beamwidth may at least contain all the beamwidths of the respective subsequent DL transmissions within the COT.

As a performance requirement or for compliance testing, a margin, θ≥0, for the selected sensing beamwidth 912 can, again, be defined. The margin may also be considered as an absolute or a relative sensing beamwidth accuracy requirement. For the example test scenario, discussed hereinbefore, if the largest relative angle between the pattern cuts defining the beamwidths of all subsequent DL transmissions is denoted as β, then the selected LBT sensing beamwidth 912 should be bounded by the values β and β+θ. The beamwidth of a subsequent transmission may be defined based on the same value, X, of dB (used for defining the sensing beamwidth 912) below the respective transmit beam peak gain, or another value, Y, of another pre-defined/configurable parameter X. Again, in the condition wherein Y=3, the transmit beamwidth may be referenced as the "half-power" beamwidth.

The selected LBT sensing beam 910 may be described as having a sensing beam peak direction 914, which, as has been discussed, is representative of the direction where the maximum total component of EIRP may be found. The LBT sensing beam 910 may be associated with a sensing beam center direction 916 that is representative of a geometric center of the sensing beamwidth. The related sensing beam peak direction 914 and the sensing beam center direction 916 might not be aligned or coinciding.

The LBT sensing beam 910 may be associated with a "sensing beam direction pair" defined as a data set including the related sensing beam peak direction 914 and the sensing beam center direction 916.

The LBT sensing beam 910 may be selected such that the sensing beam center direction 916 is aligned to, or within a specific angle, $\theta_c$, from, a reference direction, such as the mean, or the median, direction of the beam peak directions of the transmission beams 908-1, 908-2, 908-3 of the respective subsequent DL transmissions within the COT.

The specific angle, $\theta_c$, may be considered as an accuracy requirement for the measured relative angular offset of the sensing beam center direction 916 with respect to the reference direction. The LBT sensing beam 910 may also be selected such that the sensing beam center direction 916 is aligned to, or within the specific angle, $\theta_c$, from a reference direction, such as a beam peak direction of the one subsequent DL transmission associated with a maximum peak gain or a maximum coverage/interference footprint.

Alternatively, the LBT sensing beam 910 may be selected (step 802) such that the sensing beam peak direction 914 is aligned to, or within a specific angle, $\theta_p$, from, a reference direction, such as the mean or median direction of the beam peak directions of the transmission beams 908-1, 908-2, 908-3 of the respective subsequent DL transmissions within the particular COT. The specific angle, $\theta_p$, may be considered as an accuracy requirement for the measured relative angular offset of the sensing beam peak direction 916 with respect to the reference direction. Alternatively, the LBT sensing beam 910 may be selected (step 802) such that the sensing beam peak direction 914 is aligned to, or within the specific angle, $\theta_p$, from, a reference direction, such as the beam peak direction of the one subsequent DL transmission associated with a maximum peak gain or a maximum coverage/interference footprint.

Notably, the device may select (step 802) a spatial sensing filter from among a pre-defined/pre-configured set corresponding to a set of transmission beams, such as those transmission beams used for transmitting SSBs. The device may select (step 802) a spatial sensing filter that maximizes the circular cross correlations of a discrete Fourier transform (DFT) analog beamforming vector of the selected LBT sensing beam 910 and the DFT analog beamforming vectors of the subsequent transmission beams 908-1, 908-2, 908-3.

The device may select (step 802) a spatial sensing filter to maximize a sum, or an alternative statistic, of the circular cross correlations of the DFT analog beamforming vector of the selected LBT sensing beam 910 and the DFT analog beamforming vectors of the subsequent transmission beams 908-1, 908-2, 908-3.

In some cases, the antenna pattern may also be a RX pattern. One such case is a case wherein the spatial sensing filter that is selected (step 802) is a spatial receive filter that the BS 170 uses for reception of a plurality of UL RS resources. The plurality of UL RS resources may, for example, be SRSs configured to the UEs 110-1, 110-2, 110-3 that are targeted by the subsequent DL transmissions. In such a case, the spatial sensing filter may be selected (step 802) such that the sensing beam peak direction 914, of the LBT sensing beam 910, is the direction at which is found the maximum total component of RSRPs of the plurality of UL RS s. Accordingly, a best total component of effective isotropic sensitivity (EIS) is found.

The foregoing aspects of the present application allow for the use of the single, directional LBT sensing beam 910 for initiating a COT with DL transmissions intended to be transmitted in different directions, without compromising channel access and spatial reuse opportunities that are a feature of omni-directional LBT. It should be well understood that the DL transmissions may be time division multiplexed or space division multiplexed. The use of the single, directional LBT sensing beam 910 may be shown to reduce LBT complexity and energy consumption compared to the use of multiple, directional LBT sensing beams, wherein each of the multiple, directional LBT sensing beams corresponds to an intended transmission direction.

FIG. 10 illustrates an initial portion 1000 of a COT. The initial portion 1000 begins with an LBT time period 1002 in which a first UE 110-1 performs an LBT sensing procedure. The initial portion 1000 continues with the UE 110-1, upon determining (step 806) LBT success, transmitting (step 808) a UL transmission, in a UL transmission time period 1004, to a BS 170 using a transmission beam 1006.

FIG. 10 further illustrates that the initial portion 1000 of the COT includes a further LBT time period 1008 in which the BS 170 performs an LBT sensing procedure. There exists a gap 1007 between the end of the UL transmission time period 1004 and the beginning of a first transmission time period 1010-1. Accordingly, the gap 1007 includes the further LBT time period 1008. There may be a limitation on the duration of the gap 1007. That is, it may be predetermined that the duration of the gap 1007 should extend longer than a predetermined duration for the further LBT sensing procedure to be time period 1008, which is to be required within the COT.

The initial portion 1000 continues with the BS 170 transmitting a plurality of DL transmissions sharing the COT initiated by the first UE 110-1, including, in the first transmission time period 1010-1, a first DL transmission and, in a second transmission time period 1010-2, a second DL transmission. In the first transmission time period 1010-1, the BS 170 transmits a first DL transmission, to a first UE 110-1, using a first transmission beam 1012-1. In the second transmission time period 1010-2, the BS 170 transmits a second DL transmission, to a second UE 110-2, using a second transmission beam 1012-2.

The BS 170 may perform directional LBT sensing (see the further LBT time period 1008 in FIG. 10) using a spatial sensing filter and in accordance with a Cat2 (Type 2) DL channel access procedure ahead of transmitting the plurality of DL transmissions (in the first transmission time period 1010-1 and the second transmission time period 1010-2, FIG. 10) multiplexed in an SDM manner, multiplexed in a TDM manner or a multiplexed in a combination of both an SDM manner and a TDM manner within the existing COT in an unlicensed channel.

For a given system, there may be defined a maximum COT duration (MCOT). A scenario is contemplated wherein a plurality of DL transmissions have been previously transmitted. Within the MCOT, a plurality of new DL transmissions are to be transmitted. It may be that the plurality of new DL transmissions are not quasi-co-located in terms of spatial transmit parameters with any of the previously transmitted DL transmissions. Alternatively, it may be that the plurality of new DL transmissions have beam peak directions that are not covered by the LBT sensing beam 910 used by the BS 170 to initiate the COT for the previously transmitted DL transmissions.

In such a scenario, the BS 170 may reselect a new spatial sensing filter such that the resultant selected LBT sensing beam 910 covers only the beam peak directions of the plurality of new DL transmissions directions. Alternatively, the BS 170 may reselect a new spatial sensing filter such that the resultant selected LBT sensing beam 910 covers a union of all DL transmission directions, both new and previously transmitted.

In FIG. 10, the COT is initiated by the first UE 110-1. It is noted that the BS 170 may carry out a preparatory step before transmitting DL transmissions as a responding device within the MCOT duration of the COT initiated by the first UE 110-1. In FIG. 10, the DL transmission include a transmission, in the first transmission time period 1010-1, intended for the initiating UE (the first UE 110-1) as well as a DL transmission, in the second transmission time period 1010-2, that is intended to another UE (the second UE 110-2). The DL transmissions are assumed not to be quasi-co-located in terms of spatial transmit parameters with each other. Alternatively, the DL transmissions are assumed to be associated with different TCI chains.

The preparatory step may involve the BS 170 selecting a spatial sensing filter such that the resultant selected LBT sensing beam 910 covers the beam peak direction of the second transmission beam 1012-2 intended to the second UE 110-2. Alternatively, the preparatory step may involve the BS 170 selecting a spatial sensing filter such that the resultant selected LBT sensing beam 910 covers a union of all DL transmission beam peak directions. When the BS 170 is selecting a spatial sensing filter when sharing the COT initiated by another device, the BS 170 may attempt to satisfy rules and performance requirements discussed hereinbefore in relation to the BS 170 selecting a spatial sensing filter when initiating the COT.

By allowing for resuming transmissions within the MCOT of an existing COT initiated by the same device or by allowing for transmissions within the MCOT of a shared existing COT initiated by another device, using a single LBT procedure with a wide LBT beam, spectral efficiency and latency may be shown to be improved as compared to individual LBT sensing procedures before each corresponding directional transmission of time division multiplexed transmissions. Even in the case of space division multiplexed directional transmissions, complexity and energy consumption savings may be shown to be attained compared to performing multiple parallel LBT sensing procedures in each direction of a corresponding directional transmission.

Release 16 ("Rel-16") of the known 5G system description (available from www.3gpp.org/release-16) includes details of NR-U. In Rel-16, a UE may be configured with two different default TCI states. When at least one TCI codepoint (an index of an entry in a configuration table) is mapped to two TCI states, each TCI state corresponds to a TRP.

FIG. 11 illustrates an initial portion 1100 of a COT. The initial portion 1100 begins with an LBT time period 1102 in which a UE performs an LBT sensing procedure. The initial portion 1100 continues with the UE, upon determining (step 806) LBT success, transmitting (step 808) a plurality of UL transmissions, including, in a transmission time period 1104, a first UL transmission and, in the same transmission time period 1104, a second UL transmission. In the first transmission time period 1104, the UE transmits the first UL transmission, to a first TRP 170-1, using a first transmission beam 1108-1 and the second UL transmission, to a second TRP 170-2, using a second transmission beam 1108-2.

FIG. 12 illustrates an initial portion 1200 of a COT. The initial portion 1200 begins with an LBT time period 1202 in which a UE performs an LBT sensing procedure. The initial portion 1200 continues with the UE, upon determining (step 806) LBT success, transmitting (step 808) a plurality of UL transmissions, including, in a first transmission time period 1204-1, a first UL transmission and, in a second transmission time period 1204-2, a second UL transmission. In the first transmission time period 1204-1, the UE transmits the first UL transmission, to a first TRP 170-1, using a first transmission beam 1208-1. In the second transmission time period 1204-2, the UE transmits the second UL transmission, to a second TRP 170-2, using a second transmission beam 1208-2.

Considering UL transmissions in such a case, aspects of the present application propose configuring the UE with a different spatial relation associated to a DL RS or a corresponding UL RS for each TRP.

The UE may perform directional LBT sensing using a spatial sensing filter to access one or more unlicensed channels. The UE may transmit UL transmissions to the different TRPs in the same serving cell or in different serving cells, where the UL transmissions are not spatially related and may be multiplexed in an SDM manner, multiplexed in a TDM manner or a multiplexed in a combination of both an SDM manner and a TDM manner within an existing COT in an unlicensed channel.

The UE selects a spatial sensing filter that results in a LBT sensing beam such that the sensing beamwidth of the LBT sensing beam at least contains all beam peak directions or contains beamwidths of respective transmission beams for subsequent UL transmissions within the COT. When the UE is selecting (step 802) a spatial sensing filter, the UE may attempt to satisfy rules and performance requirements discussed hereinbefore in relation to the BS 170 selecting a spatial sensing filter when initiating the COT. Alternatively, the BS 170 may select a spatial sensing filter or an LBT sensing beam (step 802) for the UE such that the LBT sensing beam covers a given set of potential UL transmission beams and the BS 170 sends a higher layer configuration message to the UE indicating the correspondence between the selected LBT sensing beam(s) and the given set(s) of potential UL transmission beams.

Aspects of the present application may also be applicable to selecting a spatial receiving filter such that the spatial properties of the resultant receive beam has a specific relationship to a plurality of transmission beams. For instance, the receive beam may cover the plurality of transmission beams such that the device may receive corresponding transmissions (in the opposite link direction) from intended receivers assuming channel reciprocity for beam correspondence.

Aspects of the present application may also be applicable to selecting a spatial transmitting filter such that the spatial properties of the resultant transmit beam has a specific relationship to a plurality of transmission beams. For instance, such a transmit beam may be used for transmitting common/multicast/broadcast transmissions to a set of receivers that includes, or partially overlaps with, a set of intended receivers of the plurality of transmission beams.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method of operating a device, the method comprising:

selecting a spatial transmit filter resulting in a transmit beam, thereby obtaining a selected transmit beam, wherein the selecting includes determining a spatial relationship between the selected transmit beam and a plurality of transmission beams to be used for a corresponding plurality of transmissions; and performing, using the selected spatial transmit filter, a transmission in a direction of the selected transmit beam;

wherein the selecting causes a transmit beamwidth of the selected transmit beam to be minimized such that the transmit beamwidth of the selected transmit beam at least contains a set of all beam peak directions of the plurality of transmission beams; and wherein at least two transmissions among the corresponding plurality of transmissions are not quasi-co-located with each other; or wherein at least two transmissions among the corresponding plurality of transmissions are associated with different transmission configuration indicator (TCI) chains.

2. The method of claim 1, wherein the spatial relationship between the selected transmit beam and the plurality of transmission beams comprises a plurality of spatial attributes.

3. The method of claim 2, wherein the plurality of spatial attributes comprise one or more of: the transmit beamwidth of the selected transmit beam, a transmit beam peak direction of the selected transmit beam, a transmit beam center direction of the selected transmit beam, or a transmit beam peak gain of the selected transmit beam.

4. The method of claim 1, wherein the corresponding plurality of transmissions comprise one of: transmissions multiplexed using space division multiplexing, transmissions multiplexed using time division multiplexing, or transmissions multiplexed using a combination of space division multiplexing and time division multiplexing.

5. The method of claim 1, wherein the set of all beam peak directions of the plurality of transmission beams is a subset of an over the air (OTA) peak directions set declared for the device, the OTA peak directions set is a set of beam peak directions for which an equivalent isotropic radiated power (EIRP) accuracy requirement is intended to be met.

6. A method of operating a device, the method comprising:

selecting a spatial receive filter resulting in a receive beam, thereby obtaining a selected receive beam, wherein the selecting includes determining a spatial relationship between the selected receive beam and a plurality of transmission beams to be used for a corresponding plurality of transmissions to a plurality of intended devices; and receiving, using the selected spatial receive filter, one or more transmissions from the plurality of intended devices in an opposite link direction;

wherein the selecting causes a receive beamwidth of the selected receive beam to be minimized such that the receive beamwidth of the selected receive beam at least contains a set of all beam peak directions of the plurality of transmission beams; and wherein at least two transmissions among the corresponding plurality of transmissions are not quasi-co-located with each other; or wherein at least two transmissions among the corresponding plurality of transmissions are associated with different transmission configuration indicator (TCI) chains.

7. The method of claim 6, wherein the spatial relationship between the selected receive beam and the plurality of transmission beams comprises a plurality of spatial attributes.

8. The method of claim 7, wherein the plurality of spatial attributes comprise one or more of: the receive beamwidth of the selected receive beam, a receive beam peak direction of the selected receive beam, a receive beam center direction of the selected receive beam, or a receive beam peak gain of the selected receive beam.

9. The method of claim 6, wherein the corresponding plurality of transmissions comprise one of: transmissions multiplexed using space division multiplexing, or transmissions multiplexed using time division multiplexing, transmissions multiplexed using a combination of space division multiplexing and time division multiplexing.

10. The method of claim 6, wherein the set of all beam peak directions of the plurality of transmission beams is a subset of an over the air (OTA) peak directions set declared for the device, the OTA peak directions set is a set of beam peak directions for which an equivalent isotropic radiated power (EIRP) accuracy requirement is intended to be met.

11. An apparatus comprising at least one processor coupled with a non-transitory computer-readable memory storing instructions, when the instructions executed by the at least one processor, cause the apparatus to perform a method, wherein the method comprising:

selecting a spatial transmit filter resulting in a transmit beam, thereby obtaining a selected transmit beam, wherein the selecting includes determining a spatial relationship between the selected transmit beam and a plurality of transmission beams to be used for a corresponding plurality of transmissions; and performing, using the selected spatial transmit filter, a transmission in a direction of the selected transmit beam;

wherein the selecting causes a transmit beamwidth of the selected transmit beam to be minimized such that the transmit beamwidth of the selected transmit beam at least contains a set of all beam peak directions of the plurality of transmission beams; and wherein at least two transmissions among the corresponding plurality of transmissions are not quasi-co-located with each other; or wherein at least two transmissions among the corresponding plurality of transmissions are associated with different transmission configuration indicator (TCI) chains.

12. The apparatus of claim 11, wherein the spatial relationship between the selected transmit beam and the plurality of transmission beams comprises a plurality of spatial attributes.

13. The apparatus of claim 12, wherein the plurality of spatial attributes comprise one or more of: the transmit beamwidth of the selected transmit beam, a transmit beam peak direction of the selected transmit beam, a transmit beam center direction of the selected transmit beam, or a transmit beam peak gain of the selected transmit beam.

14. The apparatus of claim 11, wherein the corresponding plurality of transmissions comprise one of: transmissions multiplexed using space division multiplexing, transmissions multiplexed using time division multiplexing, or transmissions multiplexed using a combination of space division multiplexing and time division multiplexing.

15. The apparatus of claim 11, wherein the set of all beam peak directions of the plurality of transmission beams is a subset of an over the air (OTA) peak directions set declared for the apparatus, the OTA peak directions set is a set of beam peak directions for which an equivalent isotropic radiated power (EIRP) accuracy requirement is intended to be met.

16. An apparatus comprising at least one processor coupled with a non-transitory computer-readable memory storing instructions, when the instructions executed by the at least one processor, cause the apparatus to perform a method, wherein the method comprising:

selecting a spatial receive filter resulting in a receive beam, thereby obtaining a selected receive beam, wherein the selecting includes determining a spatial relationship between the selected receive beam and a plurality of transmission beams to be used for a corresponding plurality of transmissions to a plurality of intended devices; and receiving, using the selected spatial receive filter, one or more transmissions from the plurality of intended devices in an opposite link direction;

wherein the selecting causes a receive beamwidth of the selected receive beam to be minimized such that the receive beamwidth of the selected receive beam at least contains a set of all beam peak directions of the plurality of transmission beams; and wherein at least two transmissions among the corresponding plurality of transmissions are not quasi-co-located with each other; or wherein at least two transmissions among the corresponding plurality of transmissions are associated with different transmission configuration indicator (TCI) chains.

17. The apparatus of claim 16, wherein the spatial relationship between the selected receive beam and the plurality of transmission beams comprises a plurality of spatial attributes.

18. The apparatus of claim 17, wherein the plurality of spatial attributes comprise one or more of: the receive beamwidth of the selected receive beam, a receive beam peak direction of the selected receive beam, a receive beam center direction of the selected receive beam, or a receive beam peak gain of the selected receive beam.

19. The apparatus of claim 16, wherein the corresponding plurality of transmissions comprise one of: transmissions multiplexed using space division multiplexing, transmissions multiplexed using time division multiplexing, or transmissions multiplexed using a combination of space division multiplexing and time division multiplexing.

20. The apparatus of claim 16, wherein the set of all beam peak directions of the plurality of transmission beams is a subset of an over the air (OTA) peak directions set declared for the apparatus, the OTA peak directions set is a set of beam peak directions for which an equivalent isotropic radiated power (EIRP) accuracy requirement is intended to be met.

* * * * *